US010828950B2

(12) United States Patent
Corghi

(10) Patent No.: US 10,828,950 B2
(45) Date of Patent: *Nov. 10, 2020

(54) MACHINE FOR FITTING AND REMOVING A TYRE AND METHOD FOR OPERATING THE MACHINE

(71) Applicant: NEXION S.P.A., Correggio (RE) (IT)

(72) Inventor: Giulio Corghi, Correggio (IT)

(73) Assignee: NEXION S.P.A., Correggio (IT)

(*) Notice: Subject to any disclaimer, the term of this patent is extended or adjusted under 35 U.S.C. 154(b) by 150 days.

This patent is subject to a terminal disclaimer.

(21) Appl. No.: 15/988,792

(22) Filed: May 24, 2018

(65) Prior Publication Data

US 2018/0264899 A1 Sep. 20, 2018

Related U.S. Application Data

(63) Continuation of application No. 14/852,035, filed on Sep. 11, 2015, now Pat. No. 10,000,101.

(30) Foreign Application Priority Data

Sep. 15, 2014 (IT) .............................. BO2014A0506
Sep. 15, 2014 (IT) .............................. BO2014A0507
(Continued)

(51) Int. Cl.
*B60C 25/138* (2006.01)
*G01M 1/06* (2006.01)
(Continued)

(52) U.S. Cl.
CPC .......... *B60C 25/138* (2013.01); *B60C 25/056* (2013.01); *B60C 25/0521* (2013.01);
(Continued)

(58) Field of Classification Search
CPC .............. B60C 25/138; B60C 25/0521; B60C 25/0542; B60C 25/0548; B60C 25/056; G01M 1/06; G01M 17/022
See application file for complete search history.

(56) References Cited

U.S. PATENT DOCUMENTS 6,405,591 B1 6/2002 Colarelli, III et al.
6,854,950 B2 2/2005 Corghi
(Continued)

FOREIGN PATENT DOCUMENTS

CN 101298231 11/2008
CN 102555702 7/2012
(Continued)

*Primary Examiner* — David B. Thomas
(74) *Attorney, Agent, or Firm* — Pearne & Gordon LLP

(57) ABSTRACT

Described is a machine (1) for fitting and removing a tyre from a corresponding wheel rim of a vehicle, comprising: a wheel-holder unit (4), which rotates about a first axis (A); at least one bead breaker tool (29), movable along a second axis (B) parallel to the first axis (A); a roller (2) rotating about a fourth axis (D) parallel to the first axis (A) and configured to move by rotation about a fifth axis (E) spaced from the fourth axis (D), between an active position where it is in contact with a tyre tread of the wheel mounted on the wheel-holder unit (4), to a position of non-interference relative to the tyre; at least one sensor (40) connected to the roller (2) for detecting a signal representing a force transmitted to the roller (2) by the tyre; a removal tool (37), which is movable by rotation about a sixth axis (F) parallel to the first axis (A) and spaced from it, between a first position proximal to the first axis (A) and a second position distal from the first axis (A), which is movable in a direction parallel to the first axis (A) and movable towards and away from the sixth axis (F).

20 Claims, 11 Drawing Sheets

(30) Foreign Application Priority Data

Sep. 15, 2014 (IT) .............................. BO2014A0508
May 20, 2015 (IT) ........................ 102015000016091

(51) Int. Cl.
*B60C 25/05* (2006.01)
*G01M 17/02* (2006.01)

(52) U.S. Cl.
CPC ...... *B60C 25/0542* (2013.01); *B60C 25/0548* (2013.01); *G01M 1/06* (2013.01); *G01M 17/022* (2013.01)

(56) References Cited

U.S. PATENT DOCUMENTS

| | | | |
|---|---|---|---|
| 7,438,109 | B2 | 10/2008 | Cunningham |
| 8,250,915 | B1 | 8/2012 | Voeller et al. |
| 8,904,863 | B1 | 12/2014 | Voeller et al. |
| 9,032,789 | B2 | 5/2015 | Braghiroli |
| 9,114,676 | B2 | 8/2015 | Sotgiu |
| 9,645,037 | B2 | 5/2017 | Meyer |
| 9,731,566 | B1 * | 8/2017 | Voeller ................ G01M 17/021 |
| 10,000,101 | B2 * | 6/2018 | Corghi .................. B60C 25/056 |
| 2009/0129901 | A1 | 5/2009 | Bonacini |
| 2012/0160425 | A1 | 6/2012 | Gonzaga et al. |
| 2013/0042980 | A1 | 2/2013 | Sotgiu |
| 2013/0146231 | A1 | 6/2013 | Bonacini |

FOREIGN PATENT DOCUMENTS

| | | |
|---|---|---|
| EP | 2361791 | 8/2011 |
| EP | 2468541 | 6/2012 |
| EP | 2361791 | 6/2013 |
| JP | 201256565 | 3/2012 |
| WO | 2011101006 | 8/2011 |
| WO | 2014/129476 | 8/2014 |

* cited by examiner

MACHINE FOR FITTING AND REMOVING A TYRE AND METHOD FOR OPERATING THE MACHINE

FIELD OF THE INVENTION

This invention relates to a machine for fitting and removing a tyre and method for operating the machine.

The invention applies to the field of equipment for tyre repair specialists and in particular to that of the wheel service machines.

BACKGROUND OF THE INVENTION

It should be noted that the term wheel (for vehicle) means the coupling between a tyre and a corresponding rim (that is, the overall tyre/rim).

Wheel service machines are divided into two main types:
balancing machines, configured to measure the static and/or dynamic unbalancing of a wheel;
machines for fitting and removing a tyre on a corresponding rim (also known in the prior art as a "tyre changer machine").

The balancing of a wheel for a vehicle is performed by the tyre repair specialist in order to eliminate or reduce to a minimum the effects of the asymmetric distribution of the weights of the tyre/rim assembly. These asymmetries are usually compensated for by the tyre repair specialist by fixing counterweights to the rim.

The asymmetry is caused by the non perfect roundness of the tyre or of the rim. This is due basically to machining defects, non-homogeneity of construction materials, and the existence of inflation valves which, although relatively light in weight, constitute additional unbalanced weights. Further causes of the wheel unbalance are linked, for example, to deformation of the rims (caused by impacts and deep potholes), out of roundness of the tyre after a certain mileage, flattening of the tread during sharp braking, and errors during fitting and removal of the wheel.

These unbalances generate forces which cause annoying vibrations at the steering wheel, chassis and frame of the vehicle, in particular at high speeds.

The forces are called, depending on the direction in which act:
radial forces (in a direction which connects the center of the rim to the tyre tread);
ateral forces (in the direction of the axis of rotation of the wheel);
tangential forces (in a direction which is tangential to the tread).

The asymmetries and non-uniformity of the rim/tyre assembly cause variations to the radial, lateral and tangential force during rotation of the wheel subjected to a load. Balancing machines comprise a frame from which a motorized spindle protrudes. A locking system makes it possible to fix the rim to the spindle, in such a way that the wheel can be placed in rotation in order to perform the measurements needed for the balancing operations. These machines measure the wheel unbalance by analyzing the timing and amplitude of the mechanical vibrations which are generated by rotating the wheel. The mechanical vibrations are measured in terms of movements, forces or pressures, by using transducers which convert the measurements collected into electrical signals. Balancing machines indicate to the user the weight and the position on the rim at which to fix the counterweights.

Machines for fitting and removing a tyre on a rim comprise a wheel-holder unit and at least one operating unit. The wheel-holder unit usually comprises a locking system which fixes the rim which fixed to a rotary supporting plate, to set it in rotation about its axis of rotation. The operating unit is usually equipped with numerous tools, used for bead breaking, removing and fitting the tyre.

During the removal, the wheel is fixed to the wheel-holder unit and set in rotation whilst a removal tool, located in the stationary position relative to the movement of the rim, is operated so as to grip a portion of a bead of the tyre and extract it from the seat of the rim. The seat of the rim is formed by the zone between the flanges (that is, annular edges) of the rim.

During the fitting, the rim is fixed to the wheel-holder unit and set in rotation whilst a fitting tool, located in the stationary position relative to the movement of the rim, is operated so as to force a zone of a bead of the tyre inside the seat of the rim.

The two types of wheel service machines, that is, balancing and tyre changer, have different features and requirements.

In the balancing machines, the wheel is rotated at an angular speed greater than that of the tyre changer machines.

In order to measure the unbalances and the forces with a high degree of accuracy, the balancing machines require a system for locking the rim which is particularly precise and stable. More specifically, the system for locking the rim must be able to center the rim extremely precisely and maintain this precision during rotation of the wheel.

In the tyre changer machines, the speed of rotation of the rim is less, but the action of the tools of the operating unit on the tyre generates high forces, which have an effect on the wheel-holder unit and on the frame of the machine. For this reason, the wheel-holder unit and the locking system of the tyre changer machines must be particularly robust and reliable.

There are also prior art wheel service machines equipped with a load roller, which, positioned at the periphery of the tyre, simulates a load applied to the tread during rotation of the wheel.

Examples of balancing machines equipped with a load roller are described in patent documents U.S. Pat. No. 8,250,915B1 and U.S. Pat. No. 6,405,591B1. Examples of tyre changer machines equipped with a load roller are described in patent documents U.S. Pat. No. 8,250,915B1, WO2014/129476A1, EP2468541A1, CN101298231A and EP2361791B1.

The use of the roller in a wheel service machine has the advantage of providing information useful to the tyre repair specialist, but there are various issues. In fact, the tyre service specialist with useful information. In effect, even if the vehicle wheel is balanced by counterweights, some non-uniformity in the tyre structure may give rise to lateral forces when the wheel is set in rotation under the action of a load One issue concerns the fixing or locking of the wheel on the rotary wheel-holder unit, in particular in the case of tyre changer machines. The locking system used in the tyre changer machines is robust, but it is a relatively imprecise. This limits the accuracy of the measurements performed with the roller, thus adversely affecting the reliability. Another issue concerns the overall dimensions, as the roller tends be bulky. That issue is particularly felt in the case of tyre changer machines equipped with a roller, as the tyre changer machines are equipped with numerous tools, which must be used by the tyre repair specialist on the wheel, simultaneously with or at different stages of the use of the tyre changer machine (for example, bead breakers, removal, fitting). In light of this, it should be noted that it also important that the tyre repair specialist has a large free space for moving around the wheel.

Thus, a tyre changer machine has an operating unit comprising a plurality of tools, to which the roller is added. For this reason, it is necessary to avoid interference between the tools of the operating unit and the roller itself. It is also necessary to allow the tyre repair specialist to alternately use the load roller and the tools of the operating unit in a reliable and fast manner, without losing time; it is also necessary to provide the tyre repair specialist with operating space which is as large as possible.

To improve the characteristics of the tyre and reduce its non-uniformity, the tyre service specialist usually removes parts of the tyre from the tread. In actual fact, this solution constitutes only a temporary remedy which often proves unsatisfactory because the amplitude of the vibrations produced remains high. Further, removing parts of the tyre from the tread means reducing the thickness of the tread and, consequently, shortening the working life of the tyre.

Among the causes of lateral forces connected with non-uniformity of tyre structure are defects known as conicity and ply steer.

To better understand the concept of conicity, let us imagine that during rotation, a wheel subjected to a load adopts a frusto-conical shape (that is, a first side wall of the tyre is larger in diameter than a second side wall. Consequently, it generates a force directed towards the apex of the cone from the first side wall to the second side wall. It should be noted that this force does not change direction if the direction of rotation of the wheel is reversed. By definition, $$\text{Concità} = \frac{FLT_{cw} + FLT_{ccw}}{2}$$

where $FLT_{cw}$ denotes a total lateral force measured in a first direction of rotation and $FLT_{ccw}$ denotes a total lateral force measured in a second direction of rotation opposite to the first.

Conicity is generally associated with non-uniformity in the tyre structure such that one side wall is more rigid than the other.

Ply steer generates lateral forces which can cause the vehicle to deviate from a straight direction of travel. These forces are generated by non-uniformity in the distribution of the outer ply layers of the tyre. These forces change direction if the direction of rotation of the wheel is reversed. By definition, $$\text{Plysteer} = \frac{FLT_{cw} - FLT_{ccw}}{2}$$

where $FLT_{cw}$ denotes a total lateral force measured in a first direction of rotation and $FLT_{ccw}$ denotes a total lateral force measured in a second direction of rotation opposite to the first.

Further information useful for the tyre service specialist can be obtained by measuring the rolling radius. On account of tyre flattening, the rolling radius of the wheel (that is, the distance between the axis of rotation of the wheel and the point of contact between tyre and load roller) is smaller than the nominal radius of the wheel (that is, the radius of the wheel when not subjected to a load). The industry reference standards (for example, ETRTO Standards Manual) define the theoretical rolling circumference, that is, the value of the dynamic circumference theoretically adopted by the wheel when subjected to a maximum predetermined load, at a speed of rotation of 60 km/h and a reference inflation pressure, as follows.

$$C_{din\_lim} = 3.05 d_n$$

where $d_n$ is the nominal diameter of the wheel (that is, the diameter of the wheel not subjected to the action of a load). To verify these standards, it is therefore necessary to set the wheel in rotation at a relatively high speed which wheel service machines, especially tyre changer machines, are not capable of reaching.

Another issue relates in general to all the wheel service machines equipped with a roller, and it relates to the completeness and the actual utility for diagnostic purposes of the data provided to the machine thanks to the measurements of the roller.

The wheel service machines equipped with a load roller provide data relating to a variation in the radial force (Radial Force Variation, RFV) and tangential force (Lateral Force Variation, LFV) during rotation of the wheel; moreover, a further parameter which may be measured by the wheel service machines equipped with a load roller is the conicity (by rotating the tyre in both directions), which depends on the behaviour of the lateral force.

However, these measurements do not allow defects to be distinguished which are linked to the conicity, or, more generally, the elastic response of the wheel, from defects which are linked to the structure of the tyre (due, for example, by possible damage). Moreover, these measurements do not provide diagnostic information on the noise level of the tyre.

The aim of this invention is to overcome the above-mentioned issues of the prior art. One aim of this disclosure is to provide a wheel service machine and a relative method of use which are particularly useful and easy to use by the tyre repair specialist. Another aim of this disclosure is to provide a wheel service machine and a relative method which are particularly useful and easy to use by the tyre repair specialist.

More specifically, an aim of this disclosure is to provide a tyre changer machine and a relative method of use which provide diagnostic information on the wheel which is particularly complete and significant.

Another aim of this disclosure is to provide a locking device for fixing the wheel to the wheel-holder unit, in a wheel service machine, which is particularly robust and precise.

SUMMARY OF THE INVENTION

These aims are fully achieved according to this disclosure as characterised in the appended claims.

In an example embodiment according to this disclosure, a tyre changer machine is provided equipped with a roller, which leaves the tyre repair specialist an ample space for operating around the wheel and which allows the tyre repair specialist to alternate the use of different tools, including the roller and the removal tool, in a particularly fast and effective manner.

This refers in particular to a machine for fitting and removing a tyre from a corresponding rim of a vehicle wheel.

In this embodiment, the tyre changer machine comprises a wheel-holder unit, which rotates about an axis; the wheel-holder unit is motor driven. Moreover, the tyre changer machine comprises at least one bead breaker tool, which is movable along a second axis parallel to the first axis.

The tyre changer machine also comprises a roller, rotating about a fourth axis parallel to the first axis. The roller can also rotate, together with a supporting structure of the roller, about a fifth axis spaced from the fourth axis, between an active position, where it is in contact with a tyre tread of the wheel mounted on the wheel-holder unit, to a non-interference position relative to the tyre. At least one sensor (preferably a sensor force) is connected to the roller to detect a signal representing a force transmitted to the roller by the tyre.

The tyre changer machine also comprises a removal tool (which is coupled to a fitting tool, or which also acts as a fitting tool).

According to an example, the wheel service machine according to the disclosure comprises a frame and a wheel-holder unit which rotates about a first axis of rotation. The machine comprises a roller which rotates about an axis parallel to the first axis. The roller is movable towards and away from the wheel-holder unit along an operating trajectory such that the axis of the roller remains parallel to the first axis. The roller is movable between a position of non-interference with the tyre of a wheel mounted on the wheel-holder unit and an active position where it applies a predetermined force to the tyre tread. The machine comprises a connecting structure to movably connect the roller to the frame.

The machine comprises at least one force sensor connected to the roller for measuring values of a force parameter representing a radial force transmitted to the roller by the tyre.

The machine comprises at least one position sensor configured to measure values of a position parameter representing a position of the roller relative to the frame.

The machine according to the disclosure comprises a processing unit connected to the force sensor and to the position sensor to calculate, as a function of the position parameter, a geometrical parameter representing a distance between the first axis and a surface of the roller in contact with the tyre tread when the roller is in the active position. The processing unit is programmed to derive a pair of values comprising a value of the radial force measured by the force sensor when the roller is in the active position and a corresponding value of the geometrical parameter calculated.

It should be noted that this solution provides the tyre service specialist with information representing the rolling radius of the roller, thus giving the tyre service specialist information which is more complete and useful for diagnostic purposes.

In one example embodiment, the wheel service machine is a tyre changer machine.

In an example embodiment, the position sensor is coupled to the connecting structure at a predetermined position to detect a predetermined zone of the connecting structure where the processing unit holds in its memory information representing the relative position between the predetermined zone and the axis of the roller. Preferably, the connecting structure comprises an articulated arm connected to the roller to move the roller by rotation about its own axis, which is spaced from the axis of the roller. Preferably, the position sensor is configured to derive a rotation of the articulated arm relative to the frame.

It should be noted that this solution allows tracing the position of the roller surface in contact with the tyre tread, when the roller is in the active position, in a particularly easy and precise manner.

In an example embodiment, the processing unit is programmed to acquire at least one further pair of values, comprising a further radial force value and a corresponding further value of the geometrical parameter. The processing unit is programmed to calculate at least one value of an elasticity parameter, representing the elasticity of the wheel to radial flattening, by comparing the pair of values with the further pair of values.

It should be noted that calculating the elasticity parameter allows, with a limited number of measurements, finding the trend of the geometrical parameter as a function of the force applied by the roller to the tyre. This solution also allows extrapolating a value of the geometrical parameter at a maximum radial force in a particularly sure and reliable manner.

The removal tool is movable together with its supporting structure connected to a column of the machine frame, for rotating about a sixth axis parallel to the first axis and spaced from it. The rotation of the removal tool relative to the sixth axis parallel to the axis of the wheel-holder unit allows the removal tool to be moved by rotation between a first position, proximal to the first axis (wherein the removal tool may be positioned in contact with the tyre), and a second position, distal from the first axis (wherein the removal tool is in a position of non-interference relative to the wheel).

Moreover, the removal tool is movable, preferably by translation, in a direction parallel to the first axis (that is, the axis of rotation of the wheel-holder unit).

The removal tool is movable, preferably by translation, towards and away from the sixth axis (around which the supporting structure of the removal tool rotates).

This allows the removal tool and, alternately, the roller, to be moved from a working position to a position of non-interference with the wheel, in a particularly fast and effective manner, without taking up the space around the wheel.

In another embodiment according to this disclosure, a locking device is provided for fixing the wheel to the wheel-holder unit, which guarantees at the same time robustness and precision. This, for example, allows the roller to be used on a tyre changer machine with the taking of particularly precise measurements, without adversely affecting the robustness and reliability of the machine during the removal, fitting and bead breaking operations.

The device for locking a rim of a wheel is designed for fixing the rim of the wheel to a wheel-holder unit equipped with a supporting plate and a hollow rotary shaft; the hollow rotary shaft has an end portion which projects in a cantilever fashion from the supporting plate.

The locking device comprises a centring cone having a through hole.

Moreover, the locking device comprises a clamping rod having at a first end and a second end. The clamping rod has, at its first end, a clamping element which can be inserted inside the hollow shaft to prevent a movement of the clamping rod along the axis of the wheel-holder unit (for example, by a shape coupling, for example of the leaf spring type). The clamping rod has, at its second end, a portion coupled to a clamping element. The clamping rod is elongate along a respective axis (which, in use, coincides with the axis of rotation of the wheel-holder unit).

The clamping element is movably coupled to the portion of the clamping rod in such a way as to be moved along the axis of the clamping rod. For example, the portion of the clamping rod is threaded and the clamping element can be rotated for translating along the axis of the clamping rod; it should be noted that there are different means of coupling, for example by grooves, racks or other systems of substantially known type. Moreover, the locking device comprises a centring flange. Operatively, the centring flange is interposed between the centring cone and the clamping element. The centring flange has a central through hole. The centring flange has a first face and a second face. The centring flange comprises a plurality of centring rods projecting from the second face. The centring rods can be inserted in corresponding radial openings of the rim.

The first end of the clamping rod can be inserted in the hole of the centring flange, with the same direction as that in which the centring rods project, and in the hole of the centring cone, with the opposite direction to that along which the centring cone is tapered.

In that way, when the clamping element is operated, the flange is pressed towards the wheel-holder unit, so that the rim (the flange of the rim) is pressed against the centring cone. This ensures a centring and a locking of the wheel on the wheel-holder unit.

The centring is particularly precise because the portion of flange in contact with the cone is that characterised by greater precision (with reference to the manufacturing tolerances and the conditions of wear).

Preferably, the centring cone rests on a zone of the supporting plate designed to oscillate parallel to the axis of the wheel-holder unit and with a spring-like action. This makes it possible to apply a particularly high clamping force without risk of ruining the rim.

In another embodiment, this disclosure provides a wheel service machine which can provide diagnostic information on the wheel which is particularly complete and significant.

In one example embodiment, the processing unit is connected to a drive unit of the wheel-holder unit to measure a wheel rotation speed parameter. The processing unit is programmed to derive, from a geometrical parameter value calculated at a first rotation speed, a modified geometrical parameter value calculated at a second rotation speed, as a function of data of a model representing a trend of the elasticity parameter as a function of the speed parameter.

Preferably, the processing unit is programmed to process a first value of the geometrical parameter, corresponding to a first rotation speed, and a second value of the geometrical parameter, corresponding to a second rotation speed, in order to derive at least one value of a first modelling parameter representing a variation of the geometrical parameter as a function of the rotation speed.

It should be noted that this solution allows extrapolating a value of the geometrical parameter at a predetermined rotation speed without taking the measurement. It should be noted that this solution enhances machine flexibility.

In an example embodiment, the processing unit is connected to a pressure sensor to measure a tyre inflation pressure parameter. The processing unit is programmed to derive, from a first value of the geometrical parameter calculated at a first inflation pressure, a modified value of the geometrical parameter at which the geometrical parameter adopts a predetermined or user set value.

Preferably, the processing unit is programmed to process a first value of the geometrical parameter at a first inflation pressure and a second value of the geometrical parameter at a second inflation pressure in order to derive data representing a trend of the geometrical parameter as a function of the inflation pressure.

It should be noted that this solution allows extrapolating a value of the geometrical parameter at a predetermined inflation pressure without taking the measurement. It should be noted that this solution enhances machine flexibility.

It should also be noted that this solution allows the tyre service specialist to know the effect of the inflation pressure on the geometrical parameter. Thus, the tyre service specialist can act on the inflation pressure to obtain a predetermined value of the geometrical parameter.

In an example embodiment, the processing unit is connected to an angular position sensor to receive a signal representing the angular position of a wheel mounted on the wheel-holder unit. The processing unit is programmed to acquire a plurality of values of the radial force parameter as a function of an angular position of the wheel about the first axis, in order to calculate a radial force value averaged relative to a predetermined angle of rotation imparted to the wheel about the first axis.

Preferably, the processing unit is configured to receive a signal representing radial force during a wheel rotation and has access to a value of an elasticity parameter representing the elasticity of the wheel to radial flattening. Preferably, the processing unit is also configured to derive an eccentricity parameter as a function of that signal and elasticity parameter.

It should be noted that this solution provides the tyre service specialist with information representing wheel eccentricity, thus giving the tyre service specialist information which is more complete and useful for diagnostic purposes.

In an example embodiment, the processing unit is configured to process data relating to at least one control parameter for four wheels of a vehicle. The processing unit is programmed to suggest an ameliorative configuration as a function of that control parameter, where the ameliorative configuration refers to one or more of the following options:
  positioning of the wheels on a vehicle;
  coupling of a tyre to a wheel rim;
  relative angular position of a tyre relative to a wheel rim.

According to the disclosure, the control parameter is one of the parameters from the following list:
  geometrical parameter;
  wheel eccentricity;
  tyre tread depth;
  wheel conicity.

In an example embodiment, the control unit is programmed to compare, for each simple combination of wheels taken two at a time, the control parameters relating to each wheel in order to obtain an analysis parameter. The control unit is programmed to identify at least one pair of wheels which minimizes the analysis parameter.

A further aim of this description is to provide a method for performing diagnostic assessment of a vehicle wheel, in a wheel service machine, comprising the following steps:
  rotating the wheel about a first axis;
  positioning a roller, whose axis of rotation is parallel to the first axis, in contact with the wheel tyre tread to apply a predetermined radial force;
  acquiring at least one force parameter representing a radial force transmitted to the roller by the tyre;
  acquiring at least one position parameter representing a position of the roller relative to the first axis;
  processing the position parameter to calculate at least one value of a geometrical parameter representing a distance between the first axis and a surface of the roller in contact with the tyre tread and to derive a pair of values comprising a value of the radial force measured by the force sensor when the roller is in the active position and a corresponding value of the geometrical parameter calculated.

In an example embodiment, the method comprises the following steps:
repositioning the roller in contact with the wheel tyre tread to apply a second predetermined radial force;
acquiring at least one further force parameter representing a radial force transmitted to the roller by the tyre;
acquiring at least one further position parameter representing a position of the roller axis relative to the first axis;
processing the further position parameter to calculate at least one value of a further geometrical parameter representing a distance between the first axis and a surface of the roller in contact with the wheel tyre tread and to derive a further pair of values;
calculating at least one value of an elasticity parameter, representing the elasticity of the wheel to radial flattening, by comparing the pair of values with the further pair of values.

If the processing unit is connected to the drive unit of the wheel-holder unit to measure a wheel rotation speed parameter, the method for performing diagnostic assessment of a vehicle wheel comprises the following steps:
acquiring at least one speed parameter representing a first rotation speed of the wheel mounted on the wheel-holder unit;
calculating, from a geometrical parameter value calculated at the first rotation speed, a modified geometrical parameter value calculated at a second rotation speed, as a function of data of a model representing a trend of the geometrical parameter as a function of the speed parameter.

If the processing unit is connected to a pressure sensor to measure a tyre inflation pressure parameter, the method for performing diagnostic assessment of a vehicle wheel comprises the following steps:
acquiring a tyre inflation pressure parameter representing a first tyre inflation pressure;
calculating, from a value of the geometrical parameter calculated at the first inflation pressure, a modified pressure parameter value at which the geometrical parameter adopts a predetermined or user set value.

It should be noted that this description provides a method for assisting the tyre service specialist, comprising the following steps:
preparing four wheels;
measuring, for each wheel, a control parameter representing a property of the wheel;
processing the control parameters for each simple combination of wheels taken two at a time to obtain an analysis parameter for each simple combination;
mounting on a front axle of a vehicle a pair of wheels which minimizes the analysis parameter.

Preferably, the control parameter represents one of the wheel properties from the following list:
conicity;
eccentricity;
tread depth;
geometrical parameter.

According to one aspect of the present disclosure, the roller is movable (preferably, but not necessarily, by rotation) towards and away from the first axis between an active position, where it is in contact with a tyre tread of a wheel mounted on the wheel-holder unit, to a non-interference position relative to the tyre.

The wheel service machine comprises at least one force sensor connected to the roller for detecting a first signal, representing a radial force transmitted to the roller by the tyre in a direction perpendicular to the axis of the roller, and/or a second signal, representing a lateral force transmitted to the roller by the tyre in a direction parallel to the axis of the roller.

Preferably, the wheel service machine comprises a first force sensor, for detecting the first signal, and a second force sensor, for detecting the second signal.

The force sensors are preferably load cells; alternatively they can be extensometers or other devices.

The wheel service machine also comprises a processing unit (comprising a processor, for example, an electronic card suitably programmed) connected to the force sensors to receive the signals and process them.

Moreover, the wheel service machine comprises a distance sensor (preferably a laser sensor, alternatively an ultrasound sensor or other device); the distance sensor is preferably a distance sensor without contact.

The distance sensor is movable along an axis parallel to the first axis.

The distance sensor is configured for scanning a profile of the wheel (rim and the tyre) mounted on the wheel-holder unit.

The processing unit is connected to the distance sensor to receive a measurement signal from it and programmed to compare the measurement signal detected by the distance sensor with the signal detected by at least one of the first and second load cells.

Preferably, the signals detected by the force sensors are acquired in a synchronous fashion relative to the distance sensor, relative to the rotation of the wheel-holder unit simultaneous with the acquisition.

Preferably, the machine comprises an encoder or another sensor for detecting a signal representing the angular position of the wheel-holder unit. The sensor is connected to the processing unit, which acquires the signal simultaneously to the signals of the force sensors and to that of the distance sensor. Preferably, the position signal of the wheel-holder unit is used to synchronise the signals of the force sensors relative to the signal of the distance sensor.

The comparison of the signals detected by the force sensors of the roller and the signals detected by the position sensor provides particularly significant information from the diagnostics point of view, since this data is surprisingly complementary from the point of view of diagnostic importance.

More specifically, the first force signal is combined or compared with a signal of a measurement of eccentricity of the tyre (obtained with the distance sensor at a fixed level, during rotation of the wheel).

On the other hand, the first force signal is combined or compared with a signal of a measurement of conicity of the tyre (obtained during a movement of the distance sensor parallel to the axis of rotation of the wheel, during rotation of the wheel).

BRIEF DESCRIPTION OF THE DRAWINGS

This and other features of the disclosure will become more apparent from the following detailed description of a preferred, non-limiting example embodiment of it, with reference to the accompanying drawings, in which.

DETAILED DESCRIPTION OF PREFERRED EMBODIMENTS OF THE INVENTION

Figure 1:
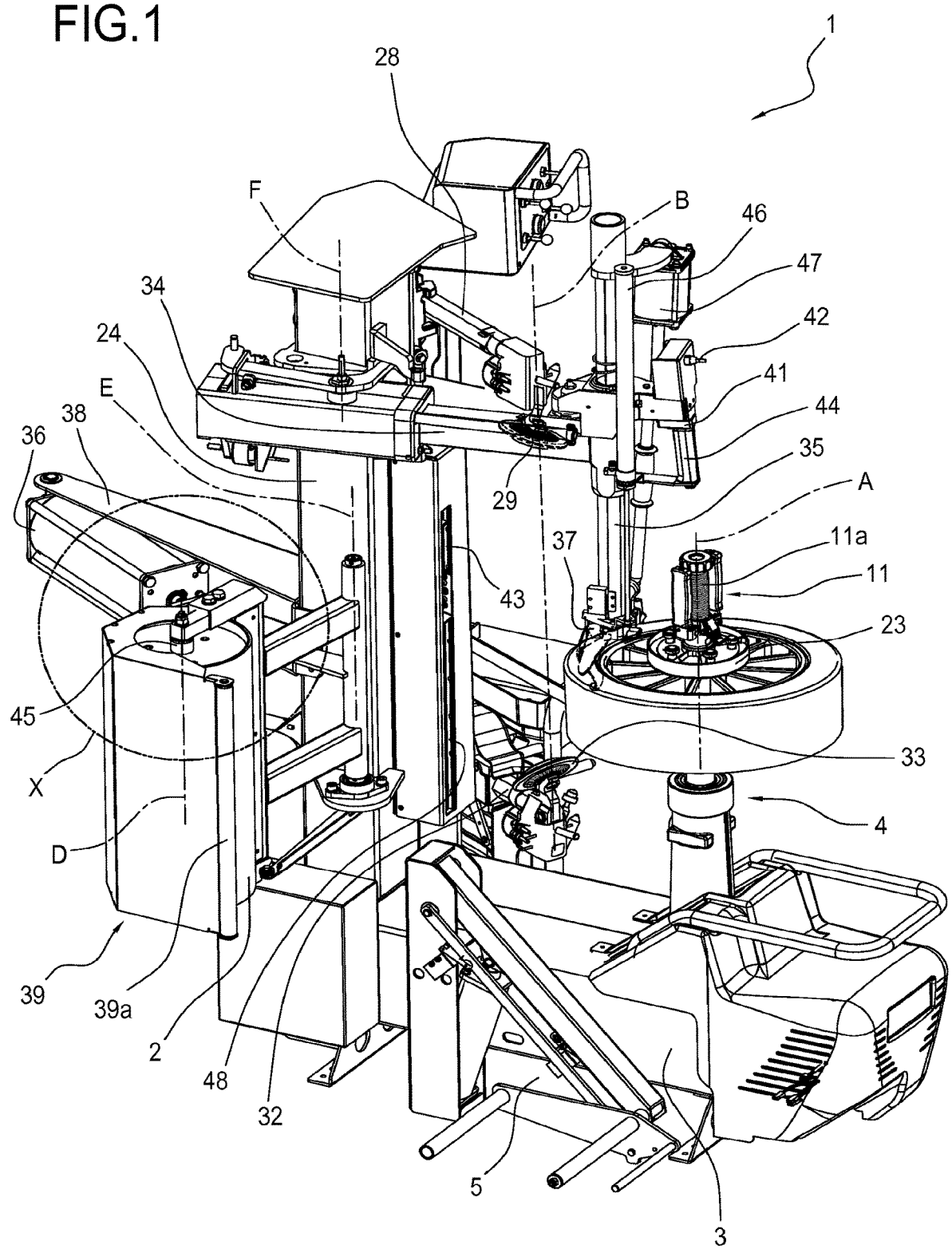
FIG. 1 shows a first perspective view of a wheel service machine according to this description, where a wheel is mounted on the wheel-holder unit, and where the roller is in a non-interference position.
Figure 2:
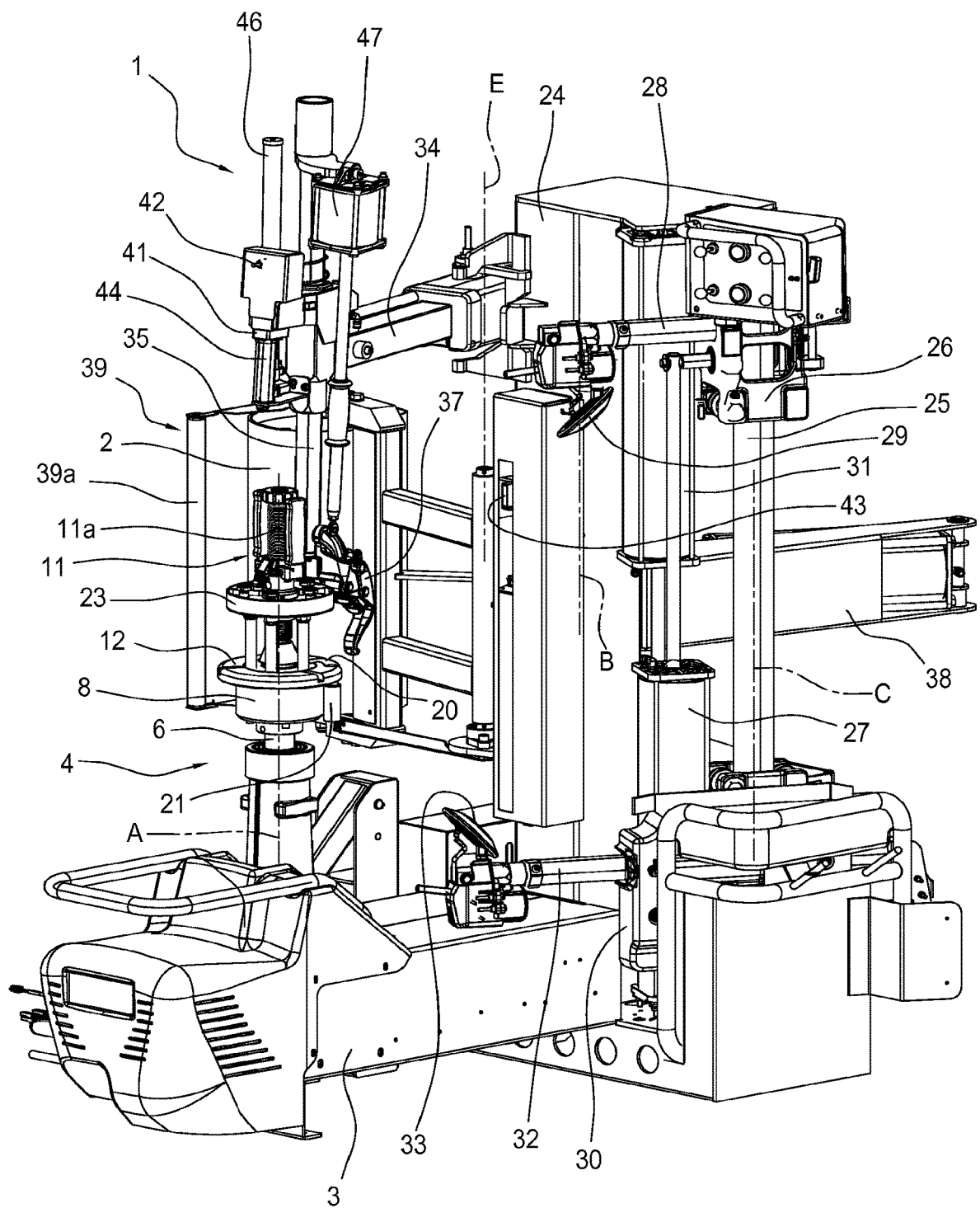
FIG. 2 shows a second perspective view of a wheel service machine according to this description, where the roller is in a non-interference position.
Figure 3:
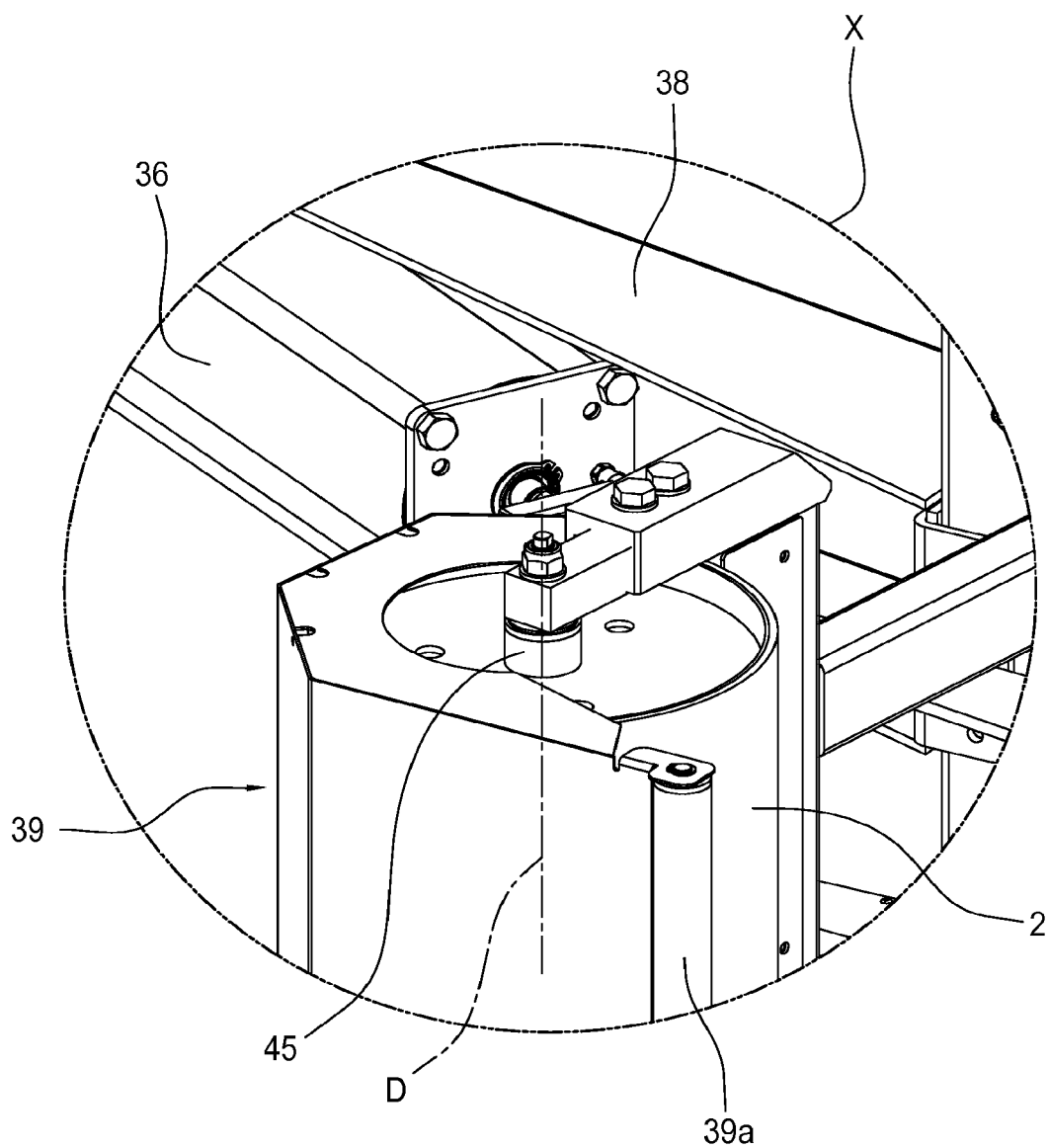
FIG. 3 shows a perspective view of an enlargement of the construction detail X from FIG. 1, according to this description.
Figure 4:
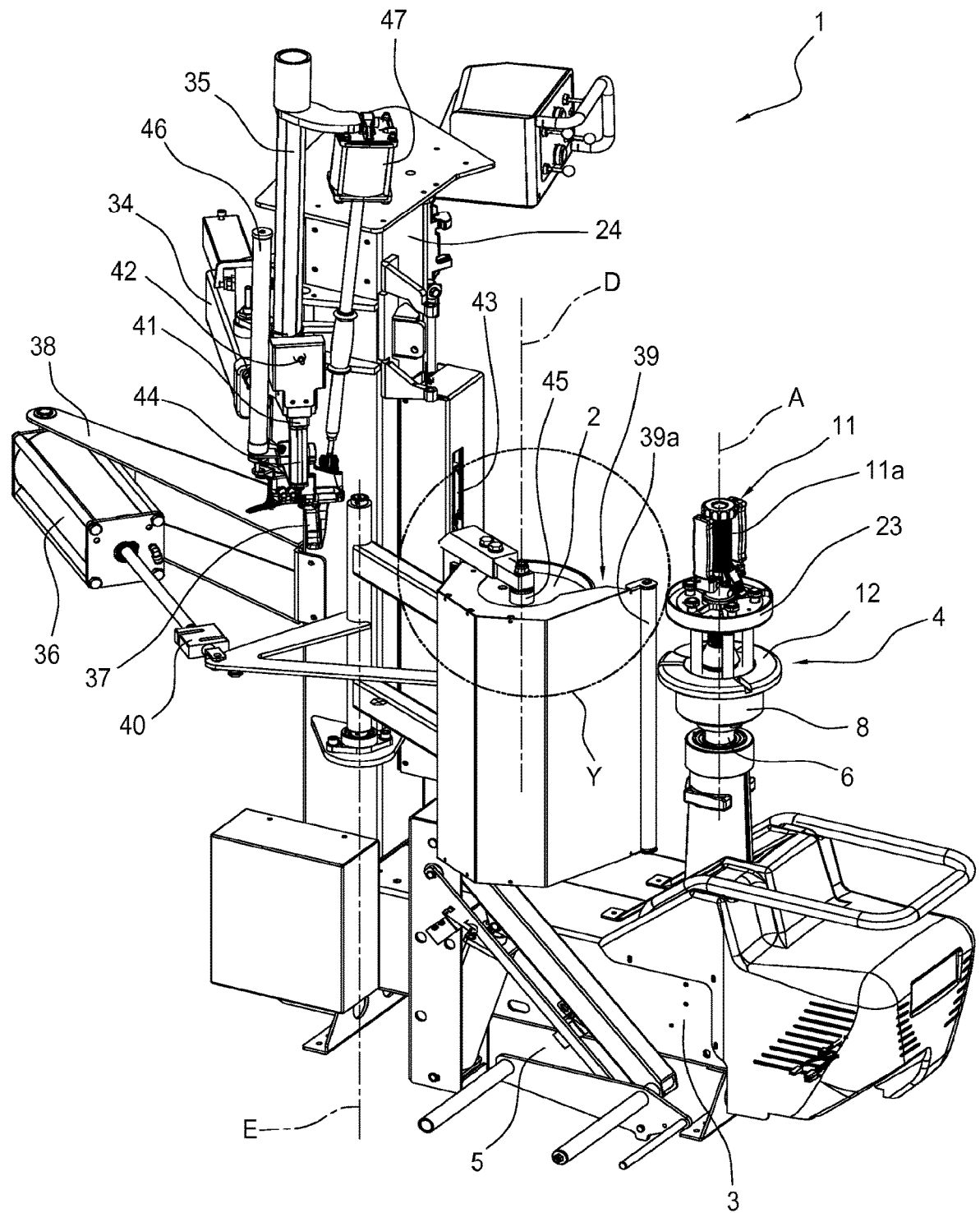
FIG. 4 shows a first perspective view, with some parts cut away to better illustrate others, of a wheel service machine, according to this description, where the roller is in an active position.
Figure 5:
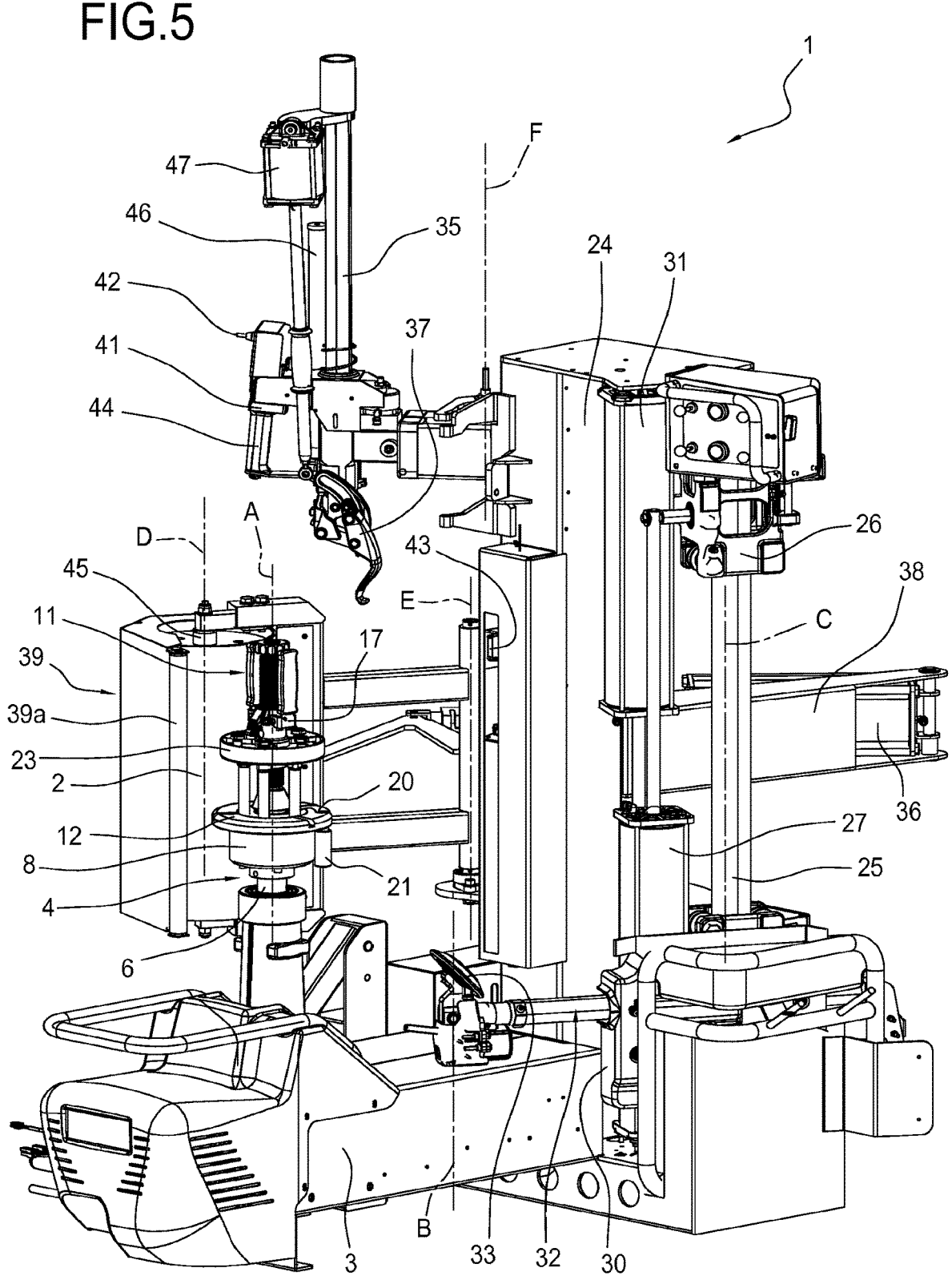
FIG. 5 shows a second perspective view, with some parts cut away to better illustrate others, of a wheel service machine, according to this description, where the roller is in an active position.
Figure 6:
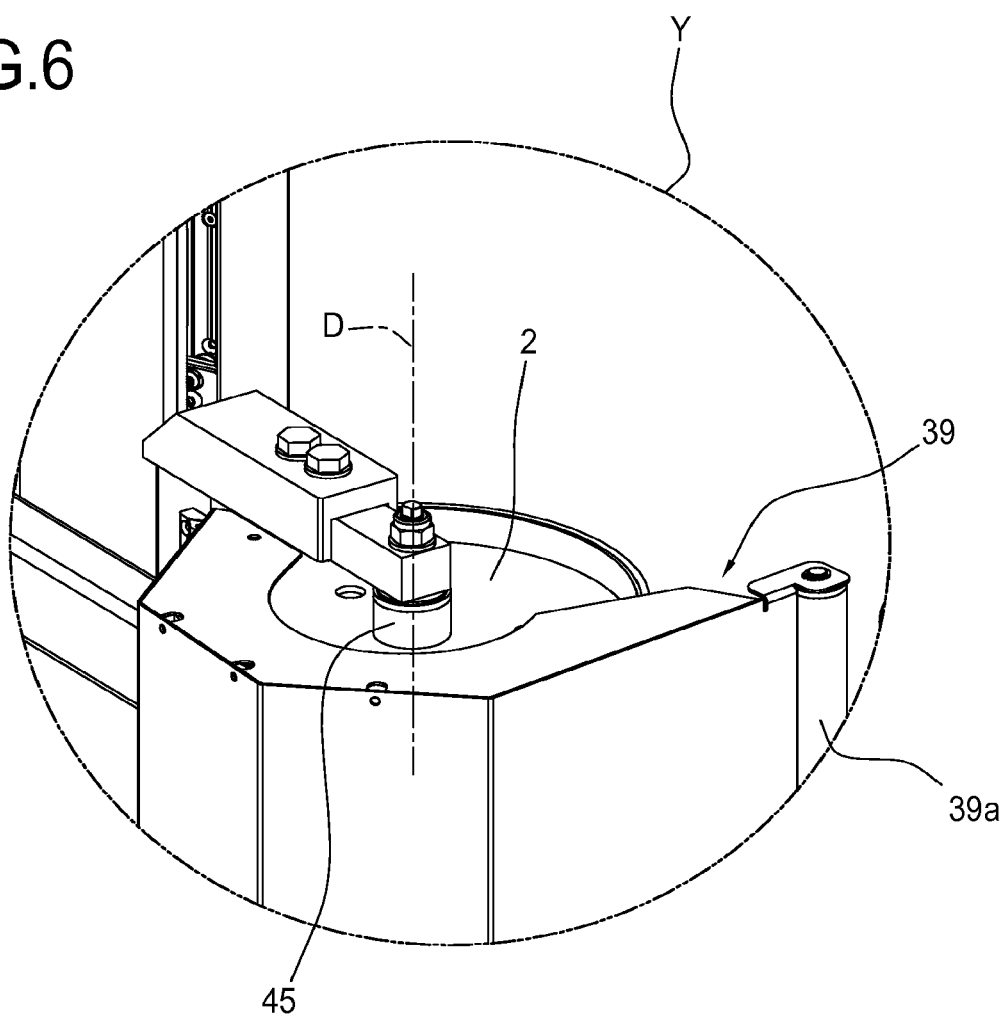
FIG. 6 shows a perspective view of an enlargement of the construction detail Y from FIG. 4, according to this description.
Figure 7:
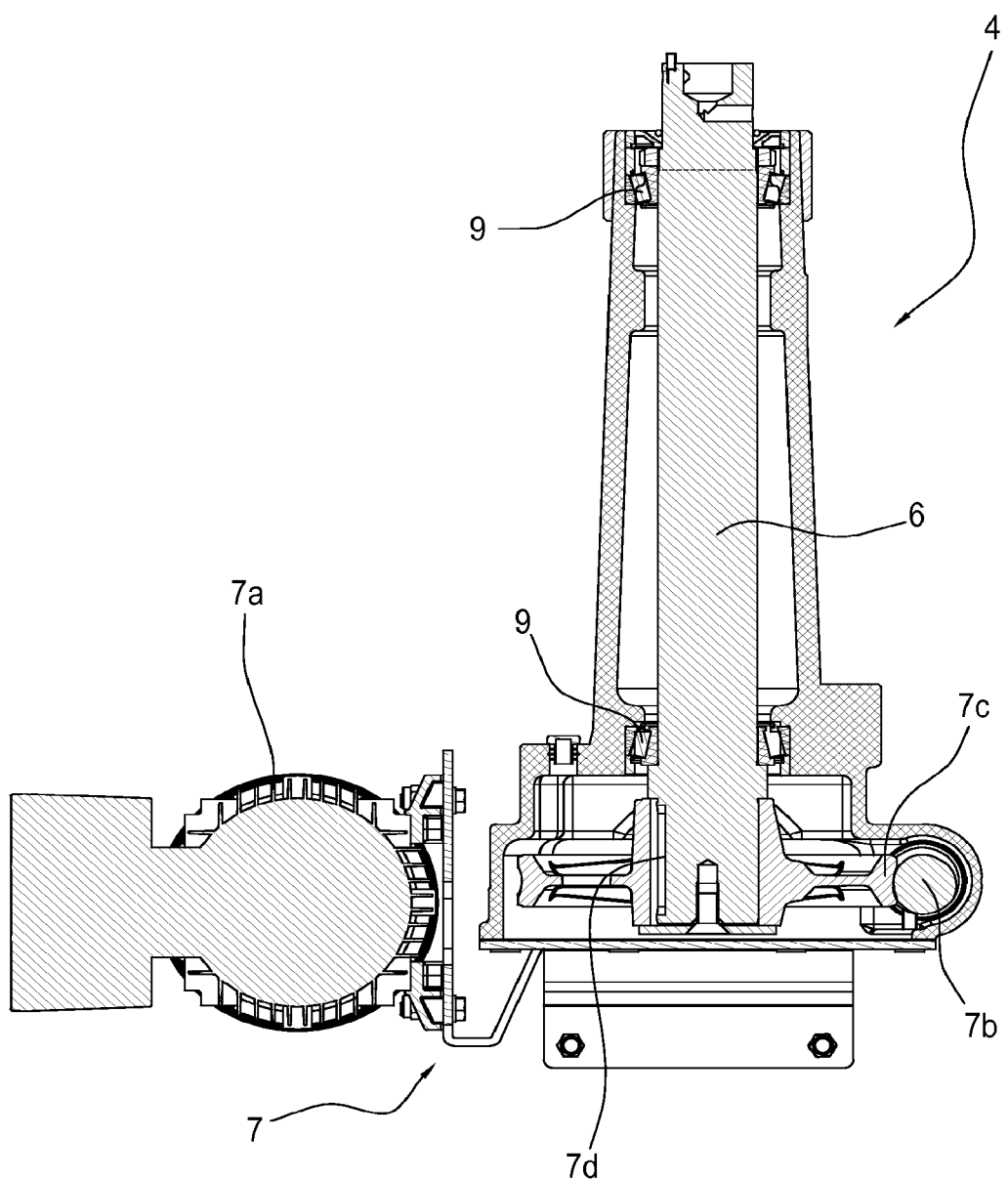
FIG. 7 shows a side cross sectional view, with some parts cut away to better illustrate others, of a wheel-holder unit of the wheel service machine of FIG. 1, according to this description.
Figure 10:
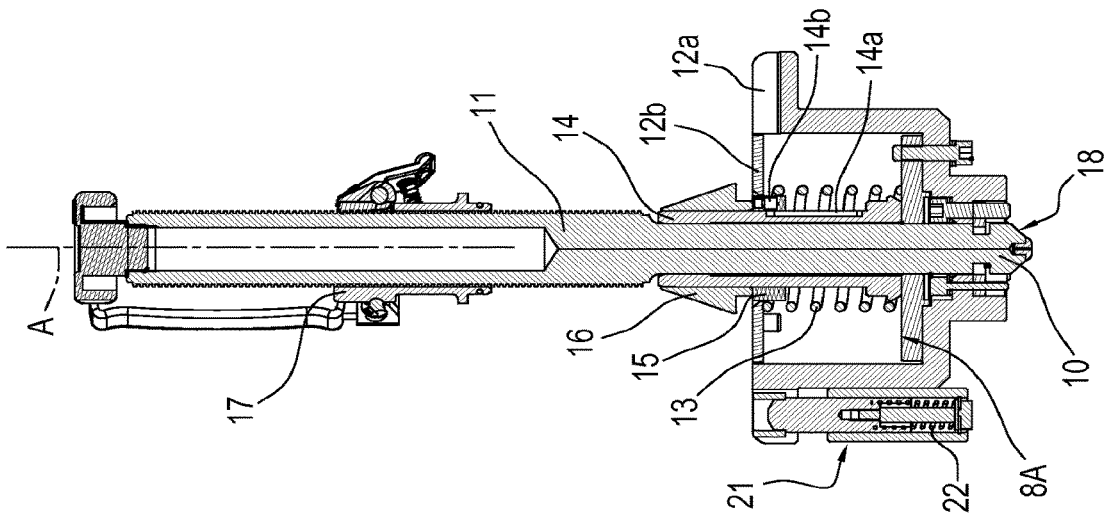
FIG. 10 shows a cross section, with some parts cut away to better illustrate others, of the detail of the wheel-holder unit of FIG. 9, according to this description.
Figure 9:
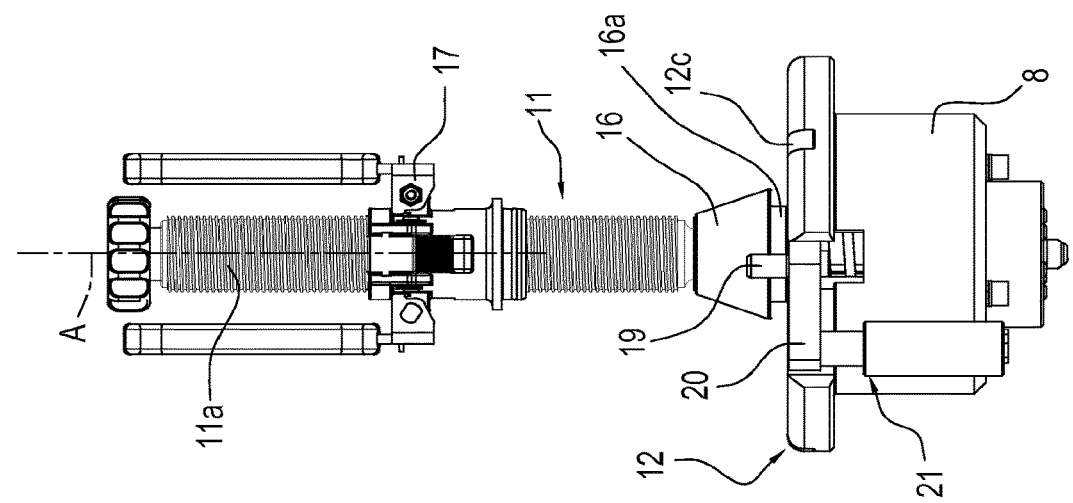
FIG. 9 shows a side view, with some parts cut away to better illustrate others, of the wheel-holder unit of the wheel service machine of FIG. 1, according to this description.
Figure 8:
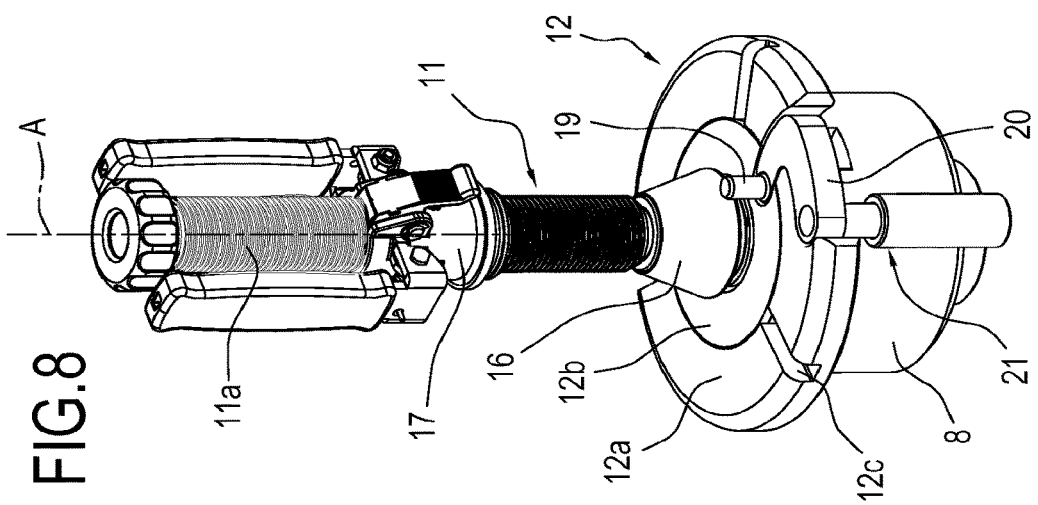
FIG. 8 shows a perspective view, with some parts cut away to better illustrate others, of a detail of the wheel-holder unit of the wheel service machine of FIG. 1, according to this description.
Figure 11:
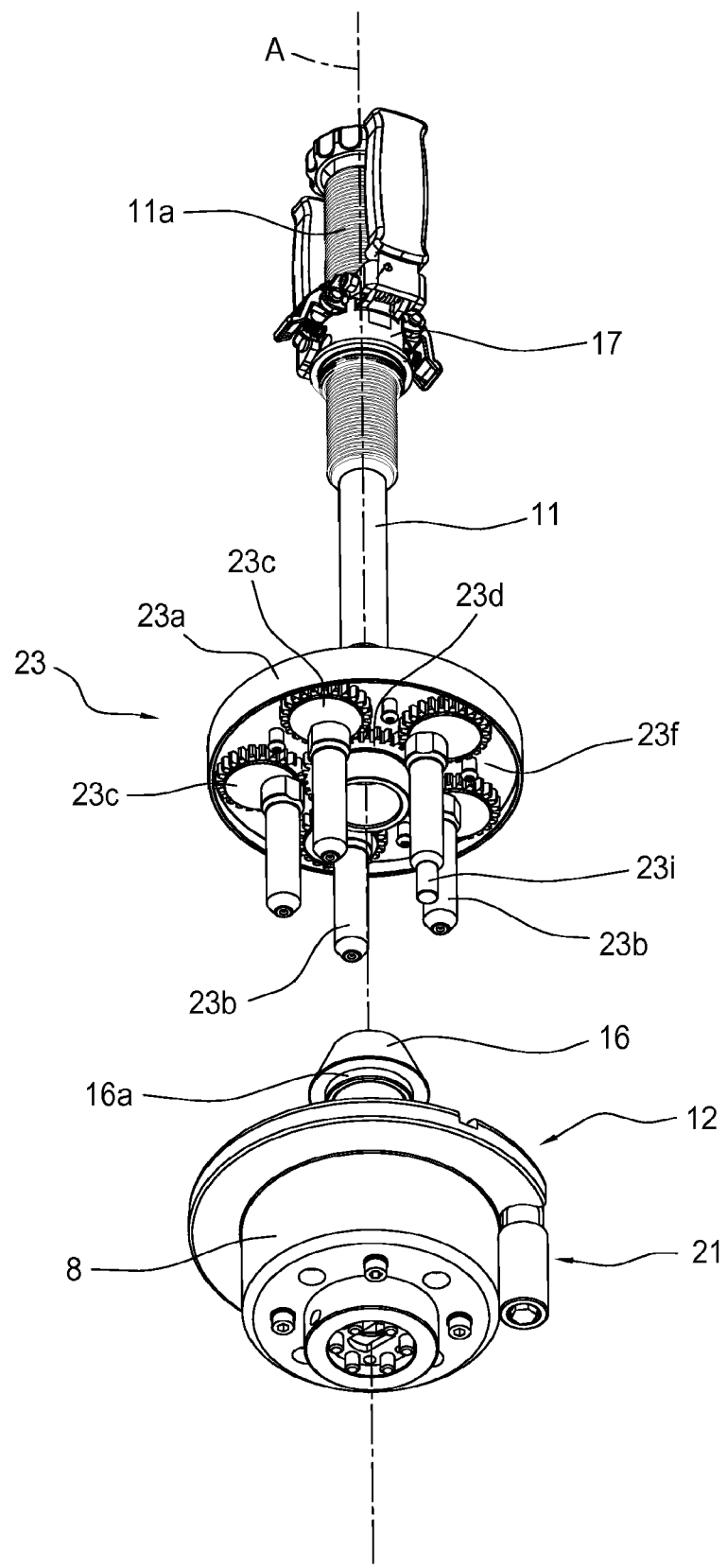
FIG. 11 shows a first perspective view, with some parts cut away to better illustrate others, of the wheel-holder unit of the wheel service machine of FIG. 1, according to this description.
Figure 12:
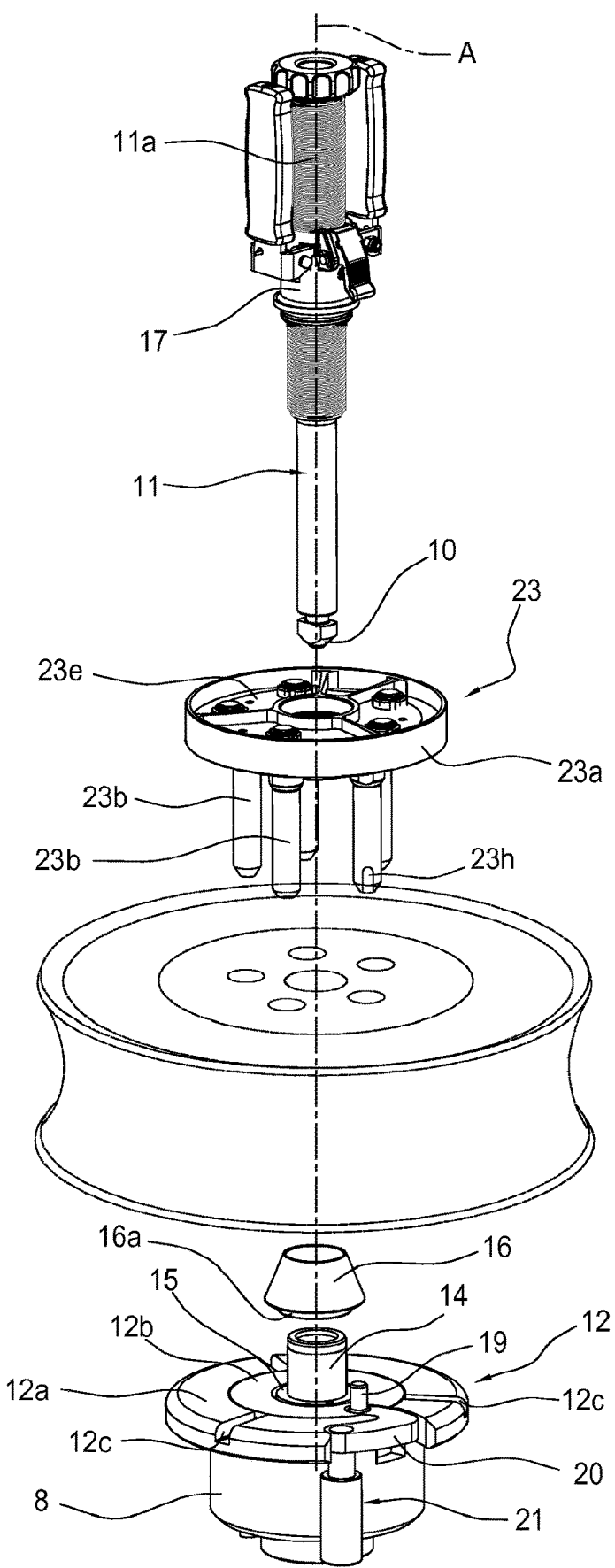
FIG. 12 shows a second perspective view, with some parts cut away to better illustrate others, of a detail of the wheel-holder unit of the wheel service machine of FIG. 1, according to this description.
Figure 13:
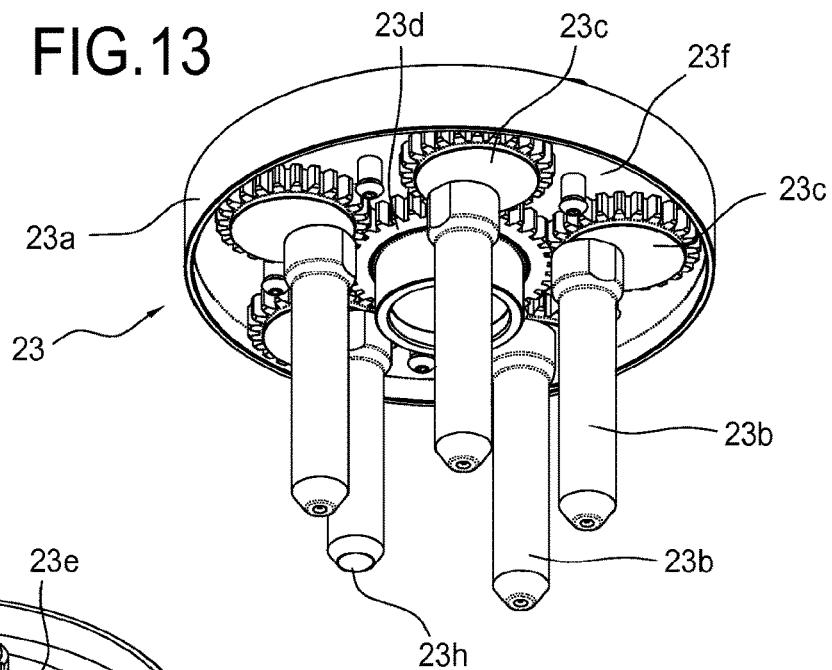
FIG. 13 shows a first perspective view of a variant embodiment of a centring flange according to this description.
Figure 14:
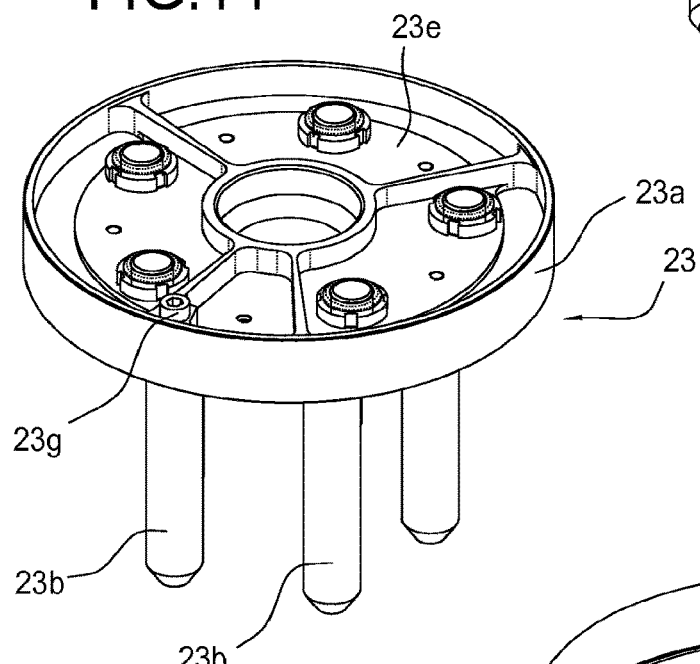
FIG. 14 shows a second perspective view of the centring flange of FIG. 13 according to this description.
Figure 15:
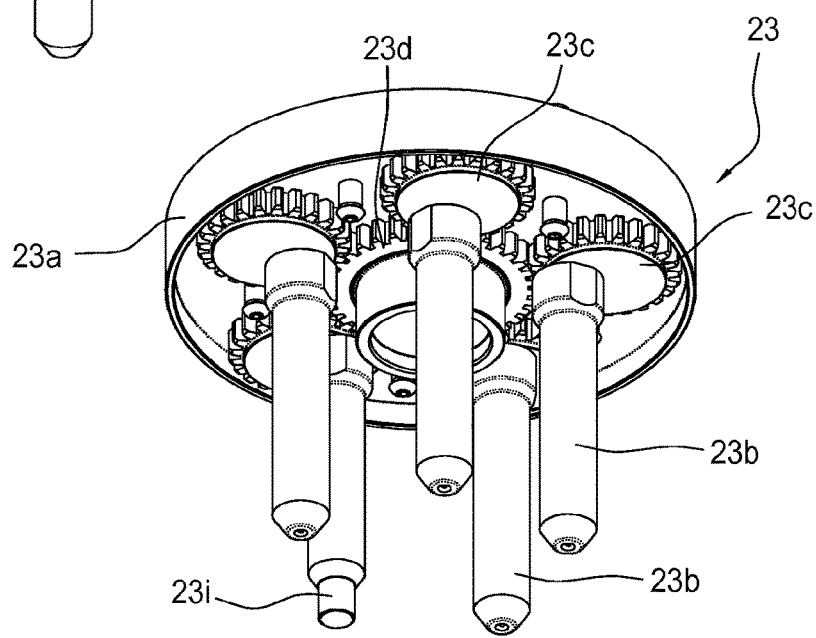
FIG. 15 shows a perspective view of a variant embodiment of a centring flange according to this description.

With reference to the accompanying drawings, the numeral 1 denotes a wheel service machine. More specifically, in the embodiment illustrated, the numeral 1 denotes a machine for fitting and removing a tyre to/from a corresponding vehicle wheel rim (that is, a tyre changer) comprising a load roller 2, according to this description.

The machine 1 comprises a frame. Preferably, the frame comprises a base 3. The base 3 comprises a wheel-holder unit 4. The wheel-holder unit 4 is designed to fix the wheel by means of a locking device and to rotate it about an axis of rotation A. Preferably, the first axis of rotation A is vertical.

Preferably, the base 3 comprises a mechanism 5 for lifting the wheel, of known type.

The wheel-holder unit 4 comprises a supporting shaft 6 having a first and a second end.

The first end of the supporting shaft 6 is connected to rotation means 7. The second end of the supporting shaft 6 is configured for coupling to a supporting apparatus 8, moving as one in the rotational movement about the first axis A.

In the embodiment illustrated, the rotation means 7 comprise a drive unit 7a connected to a drive wheel. The drive wheel is connected to a wheel driven by a transmission belt.

The driven wheel rotates a transmission shaft 7b which has a threaded portion, configured for coupling to a gear wheel 7c. The gear wheel 7c is coupled to the supporting shaft 6, preferably by a key 7d (or a tab). The supporting shaft 6 is mounted on bearings 9. Preferably, the bearings 9 are tapered roller bearings.

Preferably, the base 3 comprises a first pedal. A user can set the wheel-holder unit 4 in rotation by acting on the first pedal.

The supporting apparatus 8 has a supporting plate 12, which defines a plane perpendicular to the first axis A. The supporting plate 12 has an axial hole to allow a clamping tool (or rod) 11, of known type, to pass through.

The supporting plate 12 comprises a first annular element 12b (that is, a movable annular element 12b) and a second annular element 12a (that is, a fixed annular element 12a). Preferably, the first annular element 12b and the second annular element 12a are concentric. The second annular element 12a is situated at a greater radial distance from the first axis A than the first annular element 12b.

Preferably, the fixed annular element 12a has a plurality of radial grooves 12c. Even more preferably, the fixed annular element 12a has three radial grooves 12c which are angularly equidistant.

The supporting apparatus 8 comprises a hollow shaft, to allow the clamping rod 11 to pass through, having an end portion which projects cantilever-style from the supporting plate 12, at its axial hole. It should be noted that the hollow shaft constitutes an extension of the supporting shaft 6, in the direction of the first axis A and away from the base 3. The hollow shaft rotates as one with the supporting apparatus 8 about the first axis A. Preferably, the first annular element 12b is connected to the outer surface of the hollow shaft so as to be movable in a direction parallel to the first axis A. Preferably, the movable annular element 12b of the supporting plate 12 of the wheel-holder unit 4 has at least one tooth 14b slidably coupled to a groove 14a defined by the hollow shaft and oriented parallel to the first axis A of the wheel-holder unit 4.

In the embodiment illustrated, the supporting apparatus 8 comprises a shaped bushing 14, inserted in the hole of the supporting plate 12 and configured for guiding the clamping rod 11 during insertion. The shaped bushing 14 extends, in the direction of the first axis A, beyond the plane defined by the supporting plate 12, in a direction away from the base 3.

In the embodiment illustrated, a supporting ring 15 is connected to an inner portion of the movable annular element 12b. The supporting ring 15 is coupled to the shaped bushing 14 for guiding the movable annular element 12b in a direction parallel to the first axis A. Preferably, the shaped bushing 14 has a groove 14a, which extends in a direction parallel to the first axis A. Preferably, the movable annular element 12b is coupled to the shaped bushing 14 by the at least one tooth 14b, having an end inserted in the groove 14a.

The clamping rod 11 is formed by a longitudinal shaft having a first and a second end. The first end of the clamping rod 11 has a locking element 10 which can be inserted inside the hollow shaft to prevent a movement of the clamping rod 11 along the first axis A. In the embodiment illustrated, the first end of the clamping rod 11 is shaped to be coupled to the supporting apparatus 8 by a shape coupling 18 which, after being formed, prevents the clamping rod 11 from moving in the direction of the first axis A. Preferably, the shape coupling is a bayonet or key-type coupling.

The second end of the clamping rod 11 has a handgrip 11a and is connected to a clamping element 17 (of known type) by a threaded portion. The clamping element 17 is coupled to the threaded portion of the clamping rod 11 and can be rotated, in such a way as to move along a direction parallel to the first axis A.

It should be noted that, according to this embodiment, the hollow shaft is therefore defined by the zone between one end of the shaped bushing 14, which is distal from the base 3, and the shape coupling 18.

The supporting apparatus 8 also comprises an elastic element 13, connected to the movable annular element 12b and configured to generate a force along a direction parallel to the first axis of rotation A in a direction away from the base 3, when the movable annular member 12b is pushed in a direction parallel to the first axis A towards the base 3. In the embodiment illustrated, the elastic element 13 is interposed between the movable annular element 12b and a plate 8a in the supporting apparatus 8 and positioned perpendicularly to the first axis A.

The locking device comprises a centring cone 16, having a through hole. The through hole allows the centring cone 16 to be coupled to the end portion of the shaped bushing 14 (that is, of the hollow shaft) projecting in cantilever fashion from the supporting plate 12. It should be noted that the movable annular element 12b defines a supporting surface for receiving and supporting the centring cone 16. Preferably, the supporting surface is defined by the supporting ring 15.

Preferably, the centring cone 16 is tapered from a first enlarged end to a second narrow end and comprises an annular protrusion 16a which is smaller in diameter than the first enlarged end and which projects from the first end away from the second end.

The machine 1 according to this disclosure comprises an anti-rotation system to prevent the rim mounted on the wheel-holder unit 4 from rotating relative to the supporting plate 12. The anti-rotation system comprises an anti-rotation pin 19 oriented parallel to the first axis A of the wheel-holder unit 4 and projecting in the same direction as the end portion of the hollow shaft projecting in a cantilever fashion from the supporting plate 12. Preferably, the anti-rotation pin 19 is connected to one end of a shaped arm 20 which rotates about an axis parallel to the first axis A of the wheel-holder unit 4, for varying a distance of the anti-rotation pin 19 relative to the first axis A of the wheel-holder unit 4. Preferably, the second end of the shaped arm 20 is coupled to a cylinder-piston system 21, which defines a hinged coupling to allow the shaped arm 20 to rotate about an axis parallel to the first axis of rotation A. The cylinder-piston system 21 also comprises a spring 22, configured to allow the shaped arm 20 and the anti-rotation pin 19 to move in a direction parallel to the first axis A and to apply on the shaped arm 20 a force in a direction parallel to the first axis of rotation A, in the direction away from the base 3, when the shaped arm 20 is pushed towards the base 3.

A centring flange 23 comprises a plate 23a. The plate 23a comprises a first face 23e, a second face 23f and a central through hole. Two or more centring rods 23b, which can be inserted into corresponding radial openings of the rim, project from the second face 23f of the plate 23a in a cantilever fashion.

The two or more centring rods 23b, having an elongate shape in a direction perpendicular to a plane defined by the plate 23a, are equidistant from each other. In other words, the intersections between the directions in which the two or more centring rods 23b extend and the plane defined by the plate 23a define a plurality of points located at the vertices of an equilateral polygon.

Preferably, the two or more centring rods 23b are movable towards and away from the hole of the centring flange 23.

Preferably, at least one of the two or more centring rods 23b of the centring flange 23 forms a recess (that is, a coupling hole 23h) on an end surface of it, to receive the anti-rotation pin 19 oriented parallel to the axis of the hole of the centring flange 23 (that is, parallel to the first axis A). In a further embodiment, at least one of the two or more centring rods 23b of the centring flange 23 forms a coupling pin 23i.

Preferably, the two or more centring rods 23b are positioned along a circumference, equispaced from each other around the central hole of the centring flange 23 and are kinematically interconnected with each other by means of a gear assembly.

In the embodiment illustrated, a plurality of pinions 23c is positioned on the second face 23f of the plate 23a. Each pinion 23c rotates about its axis of rotation, perpendicular to a plane defined by the plate 23a. The plurality of pinions 23c is coupled to a crown 23d, for rotating simultaneously by the same angle.

Each of the two or more centring rods 23b comprises a first and a second end. The first end of the centring rod 23b is fixed to the periphery of a pinion 23c In other words, each of the two or more centring rods 23b is fixed to a respective pinion 23c. In this way, it is possible to increase or reduce the distance between the centring rods 23b, which remain, however, equidistant from each other.

Preferably, the second end of each of the two or more centring rods 23b is bevelled for coupling with a corresponding radial opening of the rim.

The first face 23e of the plate 23a has at least one coupling element 23g, designed to be inserted in a seat formed on the surface of the supporting plate 12. In the embodiment illustrated, the coupling element 23g is configured to be inserted in a groove 12c of the fixed annular element 12a.

When the machine 1 operates on a rim with an inverted channel, the centring flange 23 is positioned on the supporting apparatus 8 in such a way that the first face 23e of the plate 23a is in contact with the supporting plate 12, and the centring rods 23b protrude in a direction parallel to the first axis A, in a direction away from the base 3. In this way, the coupling element 23g fits into a radial groove 12c and prevents rotation of the centring flange 23 when the machine 1 operates on a rim with an inverted channel.

In the embodiment illustrated, the frame of the machine 1 comprises a column 24 associated with the base 3. The column 24 extends preferably in a direction parallel to the first axis A. Preferably, the column 24 extends vertically.

The column 24 comprises a guide 25 extending along the main direction of extension of the column 24. A first carriage 26 is slidably constrained to the guide 25 to move along the guide 25 upwards or downwards.

A first movement system is associated with the first carriage 26 with the purpose of moving the first carriage 26 between a first upper end position and a second lower end position along the guide 25.

The first movement system associated with the first carriage 26 comprises a first actuator 27.

A first arm 28 has a first and a second end. The first end of the first upper arm 28 is coupled to the first carriage 26. More specifically, the coupling is such as to allow the first arm 28 to move in a direction perpendicular to the first axis of rotation A. The second end of the first arm 28 is connected to a first bead breaker tool 29. That way, the bead breaker tool 29 is movable along a second axis B parallel to the first axis A. The coupling between the first carriage 26 and the guide 25 is such as to allow the first carriage 26 to rotate about a third axis C, preferably parallel to the first axis of rotation A, to allow the first bead breaker tool 29 to pass from an active position, where the second axis B intersects the wheel mounted on the wheel-holder unit, to a deactivated position, where the second axis B is spaced from the wheel.

A second carriage 30 is slidably constrained to the guide 25 to move along the guide 25 upwards or downwards. A second movement system is associated with the second carriage 30 to move the second carriage 30 between a first lower end position and a second upper end position along the guide 25. Preferably, the first carriage 26 and the second carriage 30 are slidably connected to the guide 25.

The second movement system associated with the second carriage 30 comprises a second actuator 31. A second arm 32 has a first and a second end. The first end of the second arm 32 is fixed to the second carriage 30. More specifically, the coupling is such as to allow the second arm 32 to move in a direction perpendicular to the first axis of rotation A. The second end of the second arm 32 is connected to a second bead breaker tool 33. Preferably, the bead breaker tools 29,33 are both movable along the second axis B. Preferably, the coupling between the second carriage 30 and the guide 25 allows the second carriage 30 to rotate about the third axis C. It should be noted that if there are two bead breaker tools (and not only one) they both rotate about the axis C or, alternatively, only one rotates.

The bead breaker tools 29,33 may therefore be moved towards or away from the axis of the wheel-holder unit, allowing the machine 1 to operate on tyres of different diameters. Each bead breaker tool 29,33 comprises a circular body supported by a supporting arm. The circular body is configured to press one tyre bead towards the opposite bead in order to detach it from the corresponding edge of the rim. The coupling between the circular body and the supporting arm allows the circular body to rotate in contact with the wheel when located in a working position.

The roller 2 of the machine 1 rotates about a fourth axis D. The roller 2 is movable towards and away from the wheel-holder unit 4 along an operating trajectory such that the axis of the roller remains parallel to the first axis A. The roller 2 is movable between a position of non-interference with the tyre of a wheel mounted on the wheel-holder unit 4 and an active position where it applies a predetermined force to the tyre tread.

The roller 2 is movably connected to the frame by means of a connecting structure. In the embodiment illustrated, the connecting structure comprises an articulated arm 38 having a first and a second end. The first end of the articulated arm 38 is coupled to the column 24 to rotate about a fifth axis E. Preferably, the fifth axis E is parallel to the first axis A.

The second end of the articulated arm 38 is coupled to the roller 2. The coupling between the articulated arm 38 and the column 24 allows the roller 2 to be moved towards the tyre of the wheel mounted on the wheel-holder unit 4, by rotating the articulated arm 38 about the fifth axis E. In other words, the rotation of the articulated arm 38 about the fifth axis E allows the roller 2 to be moved from a position of non-interference relative the tyre to an active position, where it is in contact with the tyre tread.

Preferably, the movement of the roller 2 between the active position and the non-interference position, and vice versa, is performed by means of a third actuator 36. Preferably, the third actuator 36 is a linear actuator or a worm screw which allows the roller to be locked in the active position.

The roller 2 comprises a protective shell 39, which covers a portion of the lateral surface of the roller 2, and is configured to prevent any accidents to the tyre service specialist due to contact with the roller 2 during its use. The protective shell comprises a contact element 39a, configured to make contact with the tyre tread without interfering with the functions of the latter. Preferably, the contact is of a sliding or rolling type. The protective shell is pivoted to the articulated arm 38 to rotate about an axis preferably parallel to the fourth axis D and to adapt to wheels having different diameters.

The roller 2 is equipped with a first force sensor 40 for measuring a radially directed force applied by the tyre to the roller. Preferably, the first force sensor 40 is coupled to the articulated arm 38.

Preferably, the roller 2 is equipped with a second force sensor 45, for measuring an axially directed force applied by the tyre to the roller. Preferably, the sensors 40, 45 are load cells or extensometers.

The machine 1 comprises a supporting arm 34 having a first and a second end. The first end of the supporting arm 34 is coupled to the column 24. More specifically, the coupling allows the supporting arm 34 to rotate about a sixth axis F. Preferably, the sixth axis F is parallel to the first axis A. Preferably, the supporting arm 34 is configured to extend in a direction perpendicular to the first axis of rotation A.

The second end of the supporting arm 34 is coupled to a tool holder arm 35 having a first and a second end. Preferably, the tool holder arm 35 is telescopic.

The first end of the tool holder arm 35 is coupled to a fourth actuator 46, for moving in a direction parallel to the first axis of rotation A. The second end of the tool holder arm 35 is connected to a removal tool 37. Preferably, the removal tool 37 is connected to a fifth actuator 47, which controls its movement while the tyre is being removed from/fitted to the rim. More specifically, the removal tool 37 is configured to swing about an axis in a direction perpendicular to the first axis A, and in a direction perpendicular to the direction in which the supporting arm 34 is configured to extend.

The removal tool 37 is positioned relative to the wheel-holder unit 4 to rotate from the active position to the non-interference position about the sixth axis F in a first direction of rotation. Preferably, the bead breaker tools 29,33 are positioned relative to the wheel-holder unit 4 to rotate from the active position to the non-interference position about the third axis C in a second direction of rotation, opposite the first direction of rotation. Preferably, the roller 2 is positioned relative to the wheel-holder unit 4 to rotate from the active position to the non-interference position about the fifth axis E in the first direction of rotation.

Preferably, the fourth actuator 46 is configured to allow intermediate positions of stable equilibrium between end of stroke limit positions. A first control unit 41, connected to the fourth actuator 46, defines three operating configurations: a first operating configuration in which it drives the fourth actuator 46 into a retracted limit stop position, to move the removal tool 37 away from the wheel-holder unit 4, a second operating configuration in which it drives the fourth actuator 46 so as to extract it to an extracted limit stop position, to move the removal tool 37 towards the wheel-holder unit 4, a third operating configuration in which it stops the fourth actuator 46 in a position intermediate between the retracted limit stop position and the extracted limit stop position, stopping the removal tool 37 in a position adopted at the instant of activation of the first control unit 41.

Preferably, the supporting arm 34 can be moved manually, in the direction in which it extends, by means of a first handle 44. The first handle is located preferably in the proximity of the first control unit 41 so that a user can actuate the first control unit 41 by holding the first handle 44.

The machine 1 comprises a locking mechanism, which can be operated by a second control unit 42, configured to block the movement of the removal tool 37 towards and away from the sixth axis F, without limiting movement of the tool along the direction parallel to the first axis A and rotation about the sixth axis F.

Preferably, the machine 1 also comprises a sixth actuator, connected to the supporting arm 34 to rotate it about the sixth axis F between an active angular position and a passive angular position. The sixth actuator is configured to allow two positions of stable equilibrium corresponding to a first and a second end of stroke limit position. The removal tool 37 is located at a first position, proximal to the first axis A, when the supporting arm 34 is in the active angular position, and in a second position, distal from the first axis A, when the supporting arm 34 is in the passive angular position.

Preferably, the supporting arm 34, when in the active angular position, is oriented along an axis intersecting the first axis A.

The machine 1 according to this disclosure comprises a processing unit. The processing unit is connected to the first force sensor 40 for acquiring the values of a first force parameter, representing a radial force transmitted to the roller 2, and processing them. The processing unit is connected to the second force sensor 45 for acquiring the values of a second force parameter, representing an axial force transmitted to the roller 2, and processing them.

Preferably, the machine 1 comprises a contactless distance sensor 43. Preferably, the distance sensor 43 is a laser sensor or an ultrasound sensor. The distance sensor 43 is movable along an axis parallel to the first axis A and is configured to scan a profile of the wheel mounted on the wheel-holder unit 4. Preferably, the distance sensor 43 is coupled to the column 24 by a slide 48.

The processing unit is connected to the distance sensor to receive a measurement signal from it and programmed to compare the measurement signal detected by the distance sensor 43 with a signal detected by at least one of the force sensors 40,45.

Preferably, the processing unit is connected to an angular position sensor to receive a signal representing the angular position of the wheel-holder unit 4. Preferably, the processing unit is connected to the third actuator 36 to enable or prevent its activation as a function of a position of the lifting element and/or a position of the removal tool 37.

Preferably, the processing unit is connected to the third actuator 36 to enable the activation thereof to cause the roller 2 to move close to the wheel-holder unit during rotation of the wheel on the wheel-holder unit 4. Preferably, the processing unit is connected to the third actuator 36 to enable the activation thereof to cause the roller 2 to move away from the wheel-holder unit 4 when the wheel on the wheel-holder unit 4 stops rotating.

Preferably, the processing unit is programmed to acquire in a synchronized fashion a measurement signal detected by the distance sensor 43 and a signal detected by at least one of the force sensors 40, 45 in order to derive a succession of pairs of values of the signals, where each pair of values relates to a same angular position of the wheel-holder unit 4

Preferably, the processing unit is also programmed to acquire in a synchronized fashion a measurement signal detected by the distance sensor 43, positioned in a stationary position, and a signal detected by the first force sensor 40, in order to derive a succession of pairs of values of the signals, where each pair of values relates to a same angular position of the wheel-holder unit 4 and a same position of the distance sensor 43.

Preferably, the processing unit is programmed to acquire in a synchronized fashion a measurement signal detected by the distance sensor 43 during a movement thereof along an axis parallel to the first axis A and a signal detected by the second force sensor 45, in order to derive a succession of pairs of values of the signals, where each pair of values relates to a same angular position of the wheel-holder unit 4.

Preferably, the processing unit is programmed to develop in Fourier series a signal detected by the force sensors 40, 45 and a measurement signal detected by the distance sensor 43, to calculate one or more diagnostic parameters given by the ratio of the Fourier series coefficients relating to corresponding harmonics.

Preferably, the processing unit is programmed to develop in Fourier series a signal detected by the first force sensor 40 and a measurement signal detected by the distance sensor 43, synchronized with each other, to calculate one or more diagnostic parameters given by the ratio of the Fourier series coefficients relating to corresponding harmonics.

Preferably, the processing unit is programmed to develop in Fourier series a signal detected by second force sensor 45 and a measurement signal detected by the distance sensor 43, synchronized with each other, to calculate one or more diagnostic parameters given by the ratio of the Fourier series coefficients relating to corresponding harmonics.

Preferably, the processing unit comprises a memory configured to store data and signals from the sensors of the machine 1.

With regard to the operations for removing and fitting the tyre from/to a corresponding wheel rim, attention is drawn to the following.

According to this disclosure, the machine 1 is able to perform the operations both for removing and fitting the tyre on the corresponding rim. Preferably, the removal tool 37 is configured to perform both the operations.

The machine 1 also provides the tyre service specialist with the load roller 2. The roller 2, which rotates about the fourth axis D, parallel to the first axis A, is rotated about a fifth axis E spaced from the fourth axis D, between a non-interference position relative to the tyre and an active position, where it is in contact with the tyre tread of the wheel mounted on the wheel-holder unit 4 to apply a predetermined force on the tyre tread. The rotation of the wheel-holder unit 4 and the wheel fixed to it makes it possible to measure a plurality of values of forces applied to the roller 2 by the tyre as a function of its angular position. The rotation of the wheel-holder unit 4 is stopped upon completion of the measurement and the roller 2 is returned to the non-interference position.

To proceed to removal operations, it is necessary to fix the wheel rim to the wheel-holder unit 4. The locking step will be described in more detail below.

The detachment of a bead of the tyre from a corresponding annular edge of the rim (that is, the "bead breaking" step) requires the activation by the tyre service specialist of the bead breaker tool 29. The bead breaker tool 29 is movable along the second axis B, preferably parallel to the first axis A. The bead breaker tool 29 is also movable by rotation about the third axis C, from a deactivated position, where the second axis B is spaced from the wheel, to an active position, where the second axis B intersects the wheel mounted on the wheel-holder unit 4. Once the bead breaker tool 29 is positioned in contact with a side wall of the tyre, the bead is detached from the corresponding annular edge by rotating the wheel fixed to the wheel-holder unit 4.

The rotation of the wheel-holder unit 4 and of the wheel fixed to it is stopped upon completion of the bead breaking step (at this point, bead breaking is completed).

It should be noted that the tyre has two beads. Preferably, to perform the bead breaking on a second bead the second bead breaker tool 33 is operated, which is movable along the second axis B preferably parallel to the first axis A, and movable by rotation about the third axis C, from a deactivated position, where the second axis B is spaced from the wheel, to an active position, where the second axis B intersects the wheel mounted on the wheel-holder unit 4.

Preferably, the movement of the bead breaker tools 29,33 in the direction of the second axis B is achieved by moving the first carriage 26 and the second carriage 30 along the guide 25. Preferably, the rotation of the bead breaker tools 29,33 about the third axis C occurs thanks to the coupling of the first carriage 26 and the second carriage 30 to the guide 25.

Preferably, at the end of bead breaking the bead breaker tools 29,33 are moved to the deactivated position, where the second axis B is spaced from the wheel.

The tyre service specialist activates the removal tool 37, by rotating it about the sixth axis F parallel to the first axis A and spaced from it. Preferably, the supporting arm 34, driven by the sixth actuator, rotates about the sixth axis F from a passive angular position to an active angular position. In the active angular position, the direction in which the supporting arm 34 extends intersects the first axis A.

The removal tool 37 is also moved in a direction parallel to the first axis A and in a direction perpendicular to the first axis A so as to pass from a position of non-interference relative to the wheel to an active position, where it is operatively active on the tyre.

Preferably, the tyre service specialist acts on the first control unit 41, connected to the fourth actuator 46, positioning it in a second operating configuration in which it drives the actuator so it is extracted towards an extracted limit stop position, to move the removal tool 37 in a direction parallel to the first axis A, towards the wheel-holder unit 4. Preferably, during the movement of the removal tool 37 in a direction parallel to the first axis A, the tyre service specialist acts on the first handle 44 to move the supporting arm 34 in a direction perpendicular to the first axis A, and improve the positioning of the removal tool 37 relative to the wheel in a radial direction.

After reaching the desired height, the tyre service specialist further acts on the first control unit 41, positioning it in a third operating configuration, where it stops the fourth actuator 46. Preferably, the movement of the control unit in the third operating configuration blocks the movement of the supporting arm 34 in the direction in which it extends and also blocks the movement of the tool holder arm 35 in the direction parallel to the first axis A, to allow the removal operations to be carried out.

To remove the tyre from the rim it is possible to rotate the supporting arm 34 to the passive angular position. To avoid interference with the roller 2, the tyre service specialist may act on the second control unit 42, changing it from a first to a second operating configuration. When the second control unit 42 is in the second operating configuration, the tyre service specialist may act on the first control unit 41 moving it to the first operating configuration, moving the removal tool 37 away from the wheel-holder unit 4 whilst the position of the supporting arm 34 remains locked along the direction in which it extends. It is thus possible to rotate the supporting arm 34 (that is, the removal tool 37) about the sixth axis F, without altering the distance of the removal tool 37 from the sixth axis F.

With regard to the operations for fixing the wheel (or the rim) to the wheel-holder unit 4, the tyre service specialist must couple the centring cone 16 to the end portion of the hollow shaft, in such a way that the centring cone 16 is tapered in the same direction as that in which the end portion of the hollow shaft extends.

In the embodiment in which the centring cone 16 has an annular protrusion 16a, the centring cone is positioned in such a way that the annular protrusion 16a is in contact with the movable annular element 12b.

The rim is then positioned on the supporting plate 12, in such a way that a central hole of the rim is coupled to the centring cone 16. The centring rods 23b of the centring flange 23 are inserted in the radial openings of the rim until the second face 23f (at least a portion of it) of the centring flange 23 is in contact with the rim. Next, the first end of the clamping rod 11, having a locking element 10, is inserted in the central hole of the rim and moved along the first axis A in a direction towards the base 3. Inserting the locking element 10 of the clamping rod 11 inside the hollow shaft to form the shape coupling 18 prevents further movement of the clamping rod 11 in a direction parallel to the first axis A.

The clamping element 17 is then operated, to move it along the clamping rod 11 until it presses on the first face 23e of the centring flange 23 to clamp it against the rim. In the embodiment in which the supporting plate 12 comprises the movable annular element 12b, elastically supported by the elastic element 13 so that it can be moved in a direction parallel to the first axis A, the centring cone 16 is positioned in contact with the movable annular element 12b of the supporting plate 12.

In the embodiment in which the wheel-holder unit 4 comprises an anti-rotation system to prevent relative rotation between the rim mounted on the wheel-holder unit 4 and the supporting plate 12, the anti-rotation pin 19, oriented parallel to the first axis A and projecting in the same direction as the end portion of the hollow shaft projecting in cantilever fashion from the supporting plate 12, is coupled to one end of at least one of the centring rods 23b of the centring flange 23, which has a coupling hole 23h.

According to another aspect of this description, a method for performing diagnostic assessment of a vehicle wheel is also defined.

After fixing the wheel to the wheel-holder unit 4 the roller is positioned in contact with the wheel tyre tread.

By rotating the wheel about the first axis A, the first force sensor 40 detects a first signal representing a radial force imparted to the roller 2 by the tyre in a direction perpendicular to the fourth axis D.

The second force sensor 45 detects a second signal representing a lateral force, imparted to the roller 2 by the tyre in a direction parallel to the fourth axis D.

The distance sensor 43, which is movable along an axis parallel to the first axis A and configured to scan a profile of the wheel, detects a measurement signal. The processing unit receives the first and second signals and processes them, comparing at least one of them with the measurement signal detected by the distance sensor 43.

Preferably, a third signal is detected by the distance sensor 43, positioned in a stationary position, during the rotation of the wheel, and acquired simultaneously with the first signal detected by the first force sensor 40, in such a way that the third and first signals are acquired in a synchronized fashion.

Preferably, a fourth signal is detected by the distance sensor 43 during a movement of the latter parallel to the first axis A, during the rotation of the wheel, and it is acquired simultaneously with the second signal detected by the second force sensor 45, in such a way that the third and first signals are acquired in a synchronized fashion.

Preferably, processing by the processing unit comprises developing in Fourier series the signal detected by at least one of the force sensors 40,45 and of the measurement signal detected by the distance sensor 43, to calculate one or more diagnostic parameters given by the ratio of the Fourier series coefficients relating to corresponding harmonics.

Preferably, processing by the processing unit comprises developing in Fourier series the first and third signals and calculating one or more diagnostic parameters given by the ratio of the Fourier series coefficients relating to corresponding harmonics.

Preferably, processing by the processing unit comprises developing in Fourier series the second and fourth signals and calculating one or more diagnostic parameters given by the ratio of the Fourier series coefficients relating to corresponding harmonics.

The machine 1 comprises a position sensor configured to measure values of a position parameter representing a position of the roller 2 relative to the frame.

Preferably, the position sensor is coupled to the connecting structure at a predetermined position in order to detect a position of a predetermined zone of the connecting structure. Preferably, the processing unit holds in its memory information representing the relative position between the predetermined zone and the axis D of the roller 2.

If the connecting structure of the machine 1 comprises an articulated arm 38 connected to the roller 2 in order to move the roller 2 by rotation about the fifth axis E, the position sensor is configured to derive a rotation of the articulated arm 38 relative to the frame. Preferably, the position sensor is an angular position transducer.

In an example embodiment, the processing unit contains data relating to the geometrical dimensions of the machine 1 (relating in particular to a length of the articulated arm 38 and a radius of the roller 2) to calculate a position of the fourth axis D based on trigonometric relations.

According to an aspect of this disclosure, the processing unit is configured to calculate, as a function of the position parameter, a geometrical parameter representing a distance between the first axis A and a surface of the roller 2 in contact with the tyre tread when the roller 2 is in the active position. In other words, the processing unit is programmed to derive a geometrical parameter indicating a flattening of the roller 2 subjected to a predetermined radial force (or load).

The processing unit is also programmed to derive a pair of values comprising a value of the radial force measured by the first force sensor 40 and a corresponding value of the geometrical parameter. In other words, the processing unit is programmed to associate a corresponding value of the geometrical parameter with a radial load value applied to the tyre tread.

Preferably, the processing unit is programmed to acquire at least one further pair of values in addition to the pair of values derived in relation to the predetermined force applied by the roller 2 to the tyre tread. The further pair of values comprises a further radial force value and a corresponding further value of the geometrical parameter. The processing unit is programmed to calculate at least one value of an elasticity parameter, representing the elasticity of the wheel to radial flattening, by comparing the pair of values with the further pair of values.

The value of the geometrical parameter is affected by the radial load applied by the roller 2 to the tyre tread. Preferably, the processing unit is programmed to calculate a trend of the geometrical parameter as a function of the predetermined force applied by the roller 2.

More specifically, by taking at least two different radial load measurements, it is possible to define at least two test points on a graph where a first Cartesian axis (or axis of abscissas) shows values of the predetermined force applied to the tyre by the roller 2 and a second Cartesian axis (axis of ordinates) shows values of the geometrical parameter, thus defining a radial force-geometrical parameter plane. The processing unit is programmed to calculate a first angular coefficient of a straight line passing through the at least two test points in the radial force-geometrical parameter plane. Based on a hypothesis of linearity, this angular coefficient is the elasticity parameter.

In a further example embodiment, the processing unit is configured to calculate the elasticity parameter from a first plurality of test points in the radial force-geometrical parameter plane, for example by calculating the coefficients of a linear regression.

If the hypothesis of linearity is not satisfied, the processing unit is programmed to calculate, by means of an iterative algorithm, a first plurality of parametric coefficients of a first parametric function for interpolating the first plurality of test points.

In an example embodiment, at least one test point of the first plurality of test points corresponds to a value of the geometrical parameter in the absence of a load.

Preferably, this geometrical parameter is calculated by the processing unit based on a measurement signal from the distance sensor 43. In other words, the value of the geometrical parameter in the absence of a load is calculated using data from a tyre profile scan by means of the distance sensor 43.

In an example embodiment, the processing unit is connected to the angular position sensor to receive a signal representing an angular position of a wheel mounted on the wheel-holder unit 4. The processing unit is programmed to acquire a plurality of values of the radial force parameter as a function of an angular position of the wheel about the first axis A, in order to calculate a radial force value averaged relative to a predetermined angle of rotation imparted to the wheel about the first axis A. In other words, the processing unit is configured to associate radial force values measured by the first force sensor 40 with corresponding angular positions of the wheel relative to the first axis A. Preferably, the processing unit is programmed to derive a radial force value averaged on a 360° angle of rotation of the wheel.

In an example embodiment, the processing unit is configured to receive a signal representing radial force during a rotation of the wheel and has access to a memory containing at least one value of the elasticity parameter, to derive an eccentricity parameter as a function of that signal and that elasticity parameter. Preferably, the processing unit is programmed to calculate the eccentricity parameter by means of the following relation:

$$R(\theta) = R_0 + dR(\theta) = \frac{F_0}{k} + \frac{dF(\theta)}{k};$$

where $R(\theta)$ is the eccentricity parameter at an angular position $\theta$, $R_0$ is a nominal radius of a wheel, $dR(\theta)$ is a deviation of the wheel radius from the nominal value $R_0$ at an angular position $\theta$, $F_0$ is a predetermined value of radial force, $dF(\theta)$ is a deviation from the predetermined value $F_0$ of a radial force measured by the first force sensor 40 at an angular position $\theta$, and k is the elasticity parameter.

In one example embodiment, the processing unit is connected to a drive unit 7a of the wheel-holder unit 4 to measure a wheel rotation speed parameter.

In one example embodiment, the processing unit is programmed to derive a trend of the elasticity parameter as a function of the speed parameter. In other words, the processing unit is programmed to calculate a variation of the angular coefficient in the radial force-geometrical parameter plane as a function of the rotation speed of the wheel mounted on the wheel-holder unit 4.

Preferably, the processing unit is programmed to derive, from a geometrical parameter value calculated at a first rotation speed value, a modified geometrical parameter value calculated at a second rotation speed value, as a function of data of a model representing a trend of the elasticity parameter as a function of the speed parameter.

In other words, the processing unit holds in its memory data relating to a trend of the elasticity parameter as a function of the rotation speed of the wheel mounted on the wheel-holder unit 4. Thanks to this data, it is possible to extrapolate the value adopted by the geometrical parameter as a function of the rotation speed of the wheel on the wheel-holder unit 4.

In one example embodiment, the processing unit is programmed to process data of a first geometrical parameter, calculated at a first rotation speed, and a second geometrical parameter, calculated at a second rotation speed, in order to derive a first modelling parameter representing a variation of the geometrical parameter as a function of the rotation speed.

More specifically, by taking at least two different rotation speed measurements (and using the roller to apply the same predetermined radial force on the tyre tread), it is possible to define at least two test points on a graph where a first Cartesian axis (or axis of abscissas) shows values of the rotation speed of the wheel mounted on the wheel-holder unit 4 and a second Cartesian axis (axis of ordinates) shows values of the geometrical parameter, that is, in a rotation speed-geometrical parameter plane. The processing unit is programmed to calculate a second angular coefficient of a straight line passing through the at least two test points in the rotation speed-geometrical parameter plane. Based on a hypothesis of linearity, this angular coefficient is the first modelling parameter.

In a further example embodiment, the processing unit is configured to calculate the first modelling parameter from a second plurality of test points in the rotation speed-geometrical parameter plane, for example by calculating the coefficients of a linear regression in the rotation speed-geometrical parameter plane.

If the hypothesis of linearity is not satisfied, the processing unit is programmed to calculate, by means of an iterative algorithm, a second plurality of parametric coefficients of a second parametric function for interpolating the second plurality of test points.

Preferably, the machine 1 comprises a pressure sensor for measuring a pressure parameter indicating a tyre inflation pressure.

The processing unit is programmed to derive, from a first value of the geometrical parameter calculated at a first inflation pressure, a modified value of the geometrical parameter at which the geometrical parameter adopts a predetermined or user set value. In other words, the processing unit contains data relating to a trend of the geometrical parameter as a function of the pressure parameter and is programmed to suggest an inflation pressure value at which the geometrical parameter adopts a predetermined or user set value.

In a further example embodiment, the processing unit is programmed to process a first value of the geometrical parameter at a first inflation pressure and a second value of the geometrical parameter at a second inflation pressure in order to derive data representing a trend of the geometrical parameter as a function of the inflation pressure. More specifically, by taking at least two different inflation pressure measurements (keeping constant the radial load applied by the roller 2 on the tyre and the rotation speed of the wheel mounted on the wheel-holder unit 4), it is possible to define at least two test points on a graph where a first Cartesian axis (or axis of abscissas) shows values of the tyre inflation pressure and a second Cartesian axis (axis of ordinates) shows values of the geometrical parameter, that is, in an inflation pressure-geometrical parameter plane. The processing unit is programmed to calculate an angular coefficient of a straight line passing through the at least two test points in the inflation pressure-geometrical parameter plane. Based on a hypothesis of linearity, this angular coefficient is a second modelling parameter.

In a further example embodiment, the processing unit is configured to calculate the second modelling parameter from a third plurality of test points in the inflation pressure-geometrical parameter plane, for example by calculating the coefficients of a linear regression.

If the hypothesis of linearity is not satisfied, the processing unit is programmed to calculate, by means of an iterative algorithm, a third plurality of parametric coefficients of a third parametric function for interpolating the third plurality of test points in the inflation pressure-geometrical parameter plane.

In one example embodiment, the processing unit is programmed to derive a trend of the elasticity parameter as a function of the tyre inflation pressure. In other words, the processing unit is programmed to calculate a variation of the angular coefficient in the radial force-geometrical parameter plane as a function of the tyre inflation pressure.

Preferably, the processing unit is programmed to derive a trend of the elasticity parameter as a function of the rotation speed of the wheel mounted on the wheel-holder unit 4 and of the inflation pressure. In other words, the processing unit is configured to derive a trend of the elasticity parameter as a function of two variables. This trend is, for example, represented by a surface in a three-dimensional space.

In an example embodiment, the processing unit is configured to process data relating to at least one control parameter for each wheel of a vehicle (that is, for at least four wheels). The processing unit is programmed to suggest an ameliorative configuration as a function of the control parameter. This ameliorative configuration refers to one or more of the following options:
  positioning of the wheels on a vehicle;
  coupling of a tyre to a wheel rim;
  relative angular position of a tyre relative to a wheel rim.

According to the disclosure, the control parameter is one of the parameters from the following list:
  geometrical parameter;
  wheel eccentricity;
  tyre tread depth;
  wheel conicity.

Preferably, the control unit is programmed to compare, for each simple combination of wheels taken two at a time, the control parameters relating to each wheel and to calculate an analysis parameter.

More specifically, there are six simple combinations of four wheels taken two at a time. The control unit is configured to calculate six analysis parameters. The analysis parameters are calculated by comparing at least two control parameters, each of which relates to one of the four wheels.

In an example embodiment, a value of an analysis parameter is determined by an absolute value of a difference between a first control parameter relating to a first wheel and a second control parameter relating to a second wheel. The control unit is configured to identify at least one pair of wheels which minimizes a value of the analysis parameter. In other words, the processing unit is configured to identify a minimum parameter from among the six analysis parameters deriving from the simple combinations of four wheels taken two at a time.

Preferably, a pair of wheels which minimizes the value of the analysis parameter is coupled together on the same axle of a vehicle. Still more preferably, a pair of wheels which minimizes the value of the analysis parameter is coupled together on a front axle of a vehicle.

It should be noted that the choice by the tyre service specialist of a certain control parameter (for example, tyre tread depth) might lead to identification of a pair of wheels different from the pair that would be identified if another control parameter (for example, the geometrical parameter) were chosen. It should be noted that this disclosure allows estimating the variation of the control parameters (and in particular, the geometrical parameter) as a function of the tyre inflation pressure to compensate, by acting on the inflation pressure, for the effects of the choice of control parameter on the ameliorative configuration.

Also defined according to this description is a method for performing diagnostic assessment of a vehicle wheel, in a wheel service machine, comprising the following steps:
  rotating the wheel about a first axis A;
  positioning a roller, whose axis of rotation D is parallel to the first axis A, in contact with the wheel tyre tread to apply a predetermined radial force;
  acquiring at least one force parameter representing a radial force transmitted to the roller 2 by the tyre;
  acquiring at least one position parameter representing a position of the roller relative to the first axis A;
  processing the position parameter to calculate at least one value of a geometrical parameter representing a distance between the first axis A and a surface of the roller in contact with the tyre tread to derive a pair of values comprising a value of the radial force measured by the first force sensor 40 when the roller 2 is in the active position and a corresponding value of the geometrical parameter calculated.

In one particular embodiment of this disclosure, the method for performing diagnostic assessment of a vehicle wheel comprises the following steps:
  repositioning the roller 2 in contact with the wheel tyre tread to apply a second predetermined radial force;
  acquiring at least one further force parameter representing a radial force transmitted to the roller 2 by the tyre;
  acquiring at least one further position parameter representing a position of the axis D of the roller 2 relative to the first axis A;
  processing the further position parameter to calculate at least one value of a further geometrical parameter representing a distance between the first axis A and a surface of the roller in contact with the wheel tyre tread and deriving a further pair of values;
  calculating at least one value of an elasticity parameter, representing the elasticity of the wheel to radial flattening, by comparing the pair of values with the further pair of values.

If the processing unit is connected to the drive unit 7a of the wheel-holder unit 4 to measure a wheel rotation speed parameter, the method for performing diagnostic assessment of a vehicle wheel comprises the following steps:
  acquiring at least one speed parameter representing a first rotation speed of the wheel mounted on the wheel-holder unit;
  calculating, from a geometrical parameter value calculated at the first rotation speed, a modified geometrical parameter value calculated at a second rotation speed, as a function of data of a model representing a trend of the geometrical parameter as a function of the speed parameter.

If the processing unit is connected to a pressure sensor to measure a tyre inflation pressure parameter, the method for performing diagnostic assessment of a vehicle wheel comprises the following steps:
  acquiring a tyre inflation pressure parameter representing a first tyre inflation pressure;
  calculating, from data representing a trend of the geometrical parameter as a function of the inflation pressure, a modified pressure parameter value at which the geometrical parameter adopts a predetermined or user set value.

It should be noted that this description provides a method for assisting the tyre service specialist, comprising the following steps:
  preparing four wheels;
  measuring, for each wheel, a control parameter representing a property of the wheel.
  processing the control parameters for each simple combination of wheels taken two at a time to obtain an analysis parameter for each simple combination;
  mounting on an axle of a vehicle a pair of wheels which minimizes the analysis parameter.

Preferably, the vehicle axle is the front axle of the vehicle.
Preferably, the control parameter represents one of the wheel properties from the following list:
  geometrical parameter;
  conicity;
  eccentricity;
  tread depth.

The paragraphs listed below, labelled with alphanumeric references, are non-limiting example modes of describing this invention.

A. A wheel service machine, comprising:
a wheel-holder unit, rotatable about a first axis;
a roller rotatable about a corresponding axis of rotation parallel to the first axis and movable towards and away from the first axis between an active position, where it is in contact with the tyre tread of a wheel mounted on the wheel-holder unit, to a non-interference position relative to the tyre;
at least one force sensor connected to the roller for detecting a first signal, representing a radial force transmitted to the roller by the tyre in a direction perpendicular to the axis of the roller, and/or a second signal, representing a lateral force transmitted to the roller by the tyre in a direction parallel to the axis of the roller;
a processing unit connected to the first and the second load cell to receive the corresponding signals detected and process them,
a contactless distance sensor 43 movable along an axis parallel to the first axis and configured to scan a profile of the wheel mounted on the wheel-holder unit, wherein the processing unit is connected to the distance sensor to receive a measurement signal from it and programmed to compare the measurement signal detected by the distance sensor with the signal detected by the at least one force sensor.

A1. The machine according to paragraph A, comprising a first sensor force, connected to the roller for detecting the first signal, and second sensor force, connected to the roller for detecting the second signal.

A2. The machine according to paragraph A or A1, wherein the processing unit is programmed to acquire in a synchronized fashion the measuring signal detected by the sensor distance and the at least one first and a second signal detected by the at least one sensor force connected to the roller in order to obtain a succession of pairs of values of said signals, wherein a first value of the pair belongs to the first or second signal and a second value of the pair belongs to the measuring signal, wherein each pair of values relates to the same angular position of the wheel-holder unit.

A3. The machine according to paragraph A2, wherein the processing unit is programmed to acquire in a synchronized fashion a measuring signal detected by the distance sensor positioned in a stationary position and the signal detected by the at least one force sensor, in order to derive a succession of pairs of values of the signals, wherein each pair of values relates to a same angular position of the wheel-holder unit and a same position of the distance sensor.

A4. The machine according to paragraph A2 or A3, wherein the processing unit is programmed to acquire in a synchronized fashion the measuring signal detected by the distance sensor during a relative movement along the axis parallel to the first axis (A) and the second signal detected by the at least one force sensor, in order to derive a succession of pairs of values of the signals, wherein each pair of values relates to a same angular position of the wheel-holder unit.

A5. The machine according to any one of the preceding paragraphs, wherein the processing unit is programmed to develop in Fourier series the at least one first or second signal detected by the at least one force sensor and the measurement signal detected by the distance sensor, to calculate one or more diagnostic parameters given by the ratio of the coefficients of the Fourier developments relating to corresponding harmonics.

A6. The machine according to paragraph A3, wherein the processing unit is programmed to develop in Fourier series the first signal detected by the at least one force sensor and the measurement signal detected by the distance sensor synchronized together, to calculate one or more diagnostic parameters given by the ratio of the coefficients of the Fourier developments relating to corresponding harmonics.

A7. The machine according to paragraph A4, wherein the processing unit is programmed to develop in Fourier series the second signal detected by the at least one force sensor and the measurement signal detected by the distance sensor synchronized together, to calculate one or more diagnostic parameters given by the ratio of the coefficients of the Fourier developments relating to corresponding harmonics.

A8. The machine according to any one of the preceding paragraphs, wherein the processing unit is connected to rotational sensor to receive a signal representing the angular position of the wheel-holder unit.

A9. The machine according to any one of the preceding paragraphs, wherein the wheel service machine is a tyre changer machine or a balancing machine.

B. A method for carrying out a diagnostic assessment of a wheel of a vehicle, in a wheel service machine, comprising the following steps:
rotation of the wheel about a first axis;
positioning a roller, oriented with its axis of rotation parallel to the first axis, in contact with a tyre tread of the wheel;
detecting at least a first signal, representing a radial force transmitted to the roller by the tyre in a direction perpendicular to the axis of the roller, or a second signal, representing a lateral force transmitted to the roller by the tyre in a direction parallel to the axis of the roller;
processing of the at least one first or second signal,
detecting a measurement signal of a distance sensor, movable along an axis parallel to the first axis and configured to scan a profile of the wheel, wherein the processing step comprises a comparison between the at least one first or second signal and the measurement signal detected by the distance sensor.

B1. The method according to paragraph B, wherein a third signal is detected by the distance sensor positioned in a stationary position, during the rotation of the wheel, and acquired simultaneously with the first signal detected by the at least one force sensor, wherein the third and first signal are acquired in a synchronized fashion, to derive a succession of pairs of values of the signals, wherein a first value of the pair belongs to the first signal and a second value of the pair belongs to the third signal, wherein each pair of values relates to a same angular position of the wheel-holder unit.

B2. The method according to paragraph B or B1, wherein a fourth signal is detected by the distance sensor during a movement of the latter parallel to the first axis, during the rotation of the wheel, and is acquired simultaneously with the second signal detected by the at least one force sensor, wherein the fourth and second signal are acquired in order to derive a succession of pairs of values of the signals, wherein a first value of the pair belongs to the first signal and a second value of the pair belongs to the third signal, wherein each pair of values relates to a same angular position of the wheel-holder unit.

B3. The method according to any one of paragraphs from B to B2, wherein the processing comprises a development in Fourier series of the at least one first or second signal detected by the at least one force sensor and the measurement signal detected by the distance sensor, to calculate one or more diagnostic parameters given by the ratio of the coefficients of the Fourier developments relating to corresponding harmonics.

B4. The method according to paragraph B3, wherein the processing comprises a development in Fourier series of the first and third signals and a calculation of one or more diagnostic parameters given by the ratio of the coefficients of the Fourier developments relating to corresponding harmonics.

B5. The method according to paragraph B2, wherein the processing comprises a development in Fourier series of the second and fourth signals and a calculation of one or more diagnostic parameters given by the ratio of the coefficients of the Fourier developments relating to corresponding harmonics.

C. A wheel service machine 1 comprising:
a frame;
a wheel-holder unit 4 rotating about a first axis A;
a roller 2 rotating about an axis parallel to the first axis and movable towards and away from the wheel-holder unit 4 along an operating trajectory such that the axis of the roller 2 remains parallel to the first axis, between a position of non-interference with the tyre of a wheel mounted on the wheel-holder unit 4 and an active position where it applies a predetermined force to the tyre tread;
a connecting structure to movably connect the roller 2 to the frame.
at least one force sensor 40 connected to the roller 2 for measuring values of a force parameter representing a radial force transmitted to the roller 2 by the tyre;
at least one position sensor configured to measure values of a position parameter representing a position of the roller 2 relative to the frame;
a processing unit connected to the at least one force sensor 40 and to the at least one position sensor,
wherein the processing unit is configured to calculate, as a function of the position parameter, a geometrical parameter representing a distance between the first axis and a surface of the roller 2 in contact with the tyre tread when the roller 2, is in the active position, and to derive a pair of values comprising a value of the radial force measured by the force sensor 40 when the roller 2 is in the active position and a corresponding value of the geometrical parameter calculated.

C1. The machine 1 according to paragraph C, wherein the position sensor is coupled to the connecting structure at a predetermined position to detect a position of a predetermined zone of the connecting structure and wherein the processing unit holds in its memory information representing a relative position between the predetermined zone and the axis of the roller 2.

C2. The machine according to paragraph C1, wherein the connecting structure comprises an articulated arm 38 connected to the roller 2 in order to move the roller 2 by rotation about a respective axis, spaced from the axis of the roller 2, and wherein the position sensor is configured to derive a rotation of the articulated arm 38 relative to the frame.

C3. The machine according to any one of the preceding paragraphs, wherein the processing unit is programmed to acquire, in addition to the pair of values derived in relation to the predetermined force applied by the roller 2 to the tyre tread, at least one further pair of values comprising a further radial force value and a corresponding further value of the geometrical parameter, and is programmed to calculate at least one value of an elasticity parameter representing an elasticity of the wheel to radial flattening, by comparing said pair of values with said further pair of values.

C4. The machine 1 according to paragraph C3, wherein the processing unit is connected to a drive unit 7a of the wheel-holder unit 4 to measure a wheel rotation speed parameter and is programmed to derive, from a geometrical parameter value calculated at a first rotation speed, a modified geometrical parameter value calculated at a second rotation speed, as a function of data of a model representing a trend of the elasticity parameter as a function of the speed parameter.

C5. The machine 1 according to paragraph C3 or C4, wherein the processing unit is programmed to process a first value of the geometrical parameter, corresponding to a first rotation speed, and a second value of the geometrical parameter, corresponding to a second rotation speed, in order to derive at least one value of a first modelling parameter representing a variation of the geometrical parameter as a function of the rotation speed.

C6. The machine according to any one of the preceding paragraphs, wherein the processing unit is connected to a pressure sensor to measure a tyre inflation pressure parameter and is programmed to derive, from a first value of the geometrical parameter calculated at a first inflation pressure, a modified value of the pressure parameter at which the geometrical parameter adopts a predetermined or user set value.

C7. The machine according to any one of the preceding paragraphs, wherein the processing unit is connected to a pressure sensor to measure a tyre inflation pressure parameter and wherein the processing unit is programmed to process a first value of the geometrical parameter at a first inflation pressure and a second value of the geometrical parameter at a second inflation pressure in order to derive data representing a trend of the geometrical parameter as a function of the inflation pressure.

C8. The machine according to any one of the preceding paragraphs, wherein the processing unit is connected to an angular position sensor to receive a signal representing an angular position of a wheel mounted on the wheel-holder unit 4, and wherein the processing unit is programmed to acquire a plurality of values of the radial force parameter as a function of an angular position of the wheel about the first axis, in order to calculate a radial force value averaged relative to a predetermined angle of rotation imparted to the wheel about the first axis.

C9. The machine according to any one of the preceding paragraphs, wherein the processing unit is configured to receive a signal representing radial force during a rotation of the wheel, has access to a value of an elasticity parameter representing an elasticity of the wheel to radial flattening, and is configured to derive an eccentricity parameter as a function of that signal and that elasticity parameter.

C10. The machine according to any one of the preceding paragraphs, wherein the processing unit is configured to process data relating to at least one control parameter for four wheels of a vehicle and is programmed to suggest an ameliorative configuration as a function of that control parameter, wherein the ameliorative configuration refers to one or more of the following options:
positioning of the wheels on a vehicle;
coupling of a tyre to a wheel rim;
relative angular position of a tyre relative to a wheel rim, and wherein the control parameter is one of the parameters from the following list:

geometrical parameter;
wheel eccentricity;
tyre tread depth;
wheel conicity.

C11. The machine (1) according to paragraph 12, wherein the control unit is programmed to compare, for each simple combination of wheels taken two at a time, the control parameters relating to each wheel and to obtain an analysis parameter, in order to identify at least one pair of wheels which minimizes the analysis parameter.

C12. The machine (1) according to any one of the preceding paragraphs, wherein the wheel service machine (1) is a tyre changer machine.

D. A method for performing diagnostic assessment of a vehicle wheel, in a wheel service machine, comprising the following steps:
rotating the wheel about a first axis;
positioning a roller, whose axis of rotation is parallel to the first axis, in contact with the wheel tyre tread to apply a predetermined radial force;
acquiring at least one force parameter representing a radial force transmitted to the roller 2 by the tyre;
acquiring at least one position parameter representing a position of the roller relative to the first axis A;
processing the position parameter to calculate at least one value of a geometrical parameter representing a distance between the first axis (A) and a surface of the roller in contact with the tyre tread and to derive a pair of values comprising a value of the radial force measured by the force sensor when the roller is in the active position and a corresponding value of the geometrical parameter calculated.

D1. The method according to paragraph D, further comprising the following steps:
repositioning the roller in contact with the wheel tyre tread to apply a second predetermined radial force;
acquiring at least one further force parameter representing a radial force transmitted to the roller 2 by the tyre;
acquiring at least one further position parameter representing a position of the axis of the roller relative to the first axis;
processing the further position parameter to calculate at least one value of a further geometrical parameter representing a distance between the first axis and a surface of the roller in contact with the wheel tyre tread and to derive a further pair of values;
calculating at least one value of an elasticity parameter, representing the elasticity of the wheel to radial flattening, by comparing the pair of values with the further pair of values.

D2. The method according to paragraph D or D1, further comprising the following steps:
acquiring at least one speed parameter representing a first rotation speed of the wheel mounted on the wheel-holder unit;
calculating, from a geometrical parameter value calculated at the first rotation speed, a modified geometrical parameter value calculated at a second rotation speed, as a function of data of a model representing a trend of the geometrical parameter as a function of the speed parameter.

D3. The method according to any one of paragraphs D to D2 further comprising the following steps:
acquiring a tyre inflation pressure parameter representing a first tyre inflation pressure;
calculating a modified pressure parameter value at which the geometrical parameter adopts a predetermined or user set value, as a function of data of a model representing a trend of the geometrical parameter as a function of the pressure parameter.

D4. The method according to any one of paragraphs D to D3, further comprising the following steps:
preparing four wheels;
measuring, for each wheel, a control parameter representing a property of the wheel.
processing the control parameters for each simple combination of wheels taken two at a time to obtain an analysis parameter for each simple combination;
mounting on an axle of a vehicle a pair of wheels which minimizes the analysis parameter.

D5. The method according to paragraph D4, wherein the control parameter represents one of the wheel properties from the following list:
conicity;
eccentricity;
tread depth;
geometrical parameter.

The invention claimed is:

1. A machine for fitting and removing a tyre from a corresponding rim of a vehicle wheel, comprising:
a wheel-holder unit rotating about a first axis;
at least one bead breaker tool, movable along a second axis parallel to the first axis;
a roller rotating about a fourth axis parallel to the first axis and configured to move by rotation about a fifth axis spaced from the fourth axis, between an active position, wherein it is in contact with a tyre tread of the wheel mounted on the wheel-holder unit, to a position of non-interference relative to the tyre;
at least one sensor connected to the roller for detecting a signal representing a force transmitted to the roller by the tyre;
a removal tool, which is movable between a first position proximal to the first axis and a second position distal from the first axis, and is movable in a direction parallel to the first axis.

2. The machine according to claim 1, comprising a second control unit connected to a locking mechanism configured to block the movement of the removal tool towards and away from the first axis, without limiting a movement of the removal tool along the direction parallel to the first axis and the rotation around the sixth axis.

3. The machine according to claim 1, comprising a locking mechanism configured to block the movement of the removal tool towards and away from the first axis and the movement of the removal tool along the direction parallel to the first axis.

4. The machine according to claim 1, comprising a protective shell positioned to cover at least one portion of the roller, which is movable relative to the roller and defining a contact element which can be positioned in contact with the tyre of the wheel mounted on the wheel-holder unit.

5. The machine according to claim 1, comprising:
a connecting structure to movably connect the roller to the frame;
at least one force sensor connected to the roller for measuring values of a force parameter representing a radial force transmitted to the roller by the tyre;
at least one position sensor configured to measure values of a position parameter representing a position of the roller relative to the frame;
a processing unit connected to the at least one force sensor and to the at least one position sensor.

6. A method of using a machine for fitting and removing a tyre from a corresponding rim of a vehicle wheel, having:
- a wheel-holder unit rotating about a first axis;
- at least one bead breaker tool, movable along a second axis parallel to the first axis;
- a roller rotating about a fourth axis;
- at least one sensor connected to the roller for detecting a signal representing a force transmitted to the roller by the tyre;
- a removal tool, wherein the method comprises the following steps:
- activating the roller, by rotating it about a fifth axis spaced from the fourth axis, from a non-interference position relative to the tyre to an active position where it is in contact with the tyre tread;
- activating the removal tool, by moving it from a position of non-interference relative the wheel to an active position, where it is operationally active on the tyre;
- adjustment of the removal tool, by moving it in a direction parallel to the first axis.

7. The method according to claim 6, comprising a step of moving, relative to the roller, a protective shell, which is configured for covering at least one portion of the roller and defines a contact element which can be positioned in contact with the tyre of the wheel mounted on the wheel-holder unit.

8. A wheel service machine, comprising:
- a frame;
- a wheel-holder unit rotating about a first axis;
- a roller rotating about an axis parallel to the first axis and movable towards and away from the wheel-holder unit along an operating trajectory such that the axis of the roller remains parallel to the first axis, between a position of non-interference with the tyre of a wheel mounted on the wheel-holder unit and an active position where it applies a predetermined force to the tyre tread;
- a connecting structure to movably connect the roller to the frame;
- at least one force sensor connected to the roller for measuring values of a force parameter representing a radial force transmitted to the roller by the tyre;
- at least one position sensor configured to measure values of a position parameter representing a position of the roller relative to the frame;
- a processing unit connected to the at least one force sensor and to the at least one position sensor, wherein the processing unit is configured to calculate, as a function of the position parameter, a geometrical parameter representing a distance between the first axis and a surface of the roller in contact with the tyre tread when the roller, is in the active position, and to derive a pair of values comprising a value of the radial force measured by the force sensor when the roller is in the active position and a corresponding value of the geometrical parameter calculated.

9. The wheel service machine according to claim 8, wherein the position sensor is coupled to the connecting structure at a predetermined position to detect a position of a predetermined zone of the connecting structure and wherein the processing unit holds in its memory information representing a relative position between the predetermined zone and the axis of the roller.

10. The wheel service machine according to claim 8, wherein the connecting structure comprises an articulated arm connected to the roller in order to move the roller by rotation about a respective axis, spaced from the axis of the roller, and wherein the position sensor is configured to derive a rotation of the articulated arm relative to the frame.

11. The wheel service machine according to claim 8, wherein the processing unit is programmed to acquire, in addition to the pair of values derived in relation to the predetermined force applied by the roller to the tyre tread, at least one further pair of values comprising a further radial force value and a corresponding further value of the geometrical parameter, and is programmed to calculate at least one value of an elasticity parameter representing an elasticity of the wheel to radial flattening, by comparing said pair of values with said further pair of values.

12. The wheel service machine according to claim 11, wherein the processing unit is connected to a drive unit of the wheel-holder unit to measure a wheel rotation speed parameter and is programmed to derive, from a geometrical parameter value calculated at a first rotation speed, a modified geometrical parameter value calculated at a second rotation speed, as a function of data of a model representing a trend of the elasticity parameter as a function of the speed parameter.

13. The wheel service machine according to claim 11, wherein the processing unit is programmed to process a first value of the geometrical parameter, corresponding to a first rotation speed, and a second value of the geometrical parameter, corresponding to a second rotation speed, in order to derive at least one value of a first modelling parameter representing a variation of the geometrical parameter as a function of the rotation speed.

14. The wheel service machine according to claim 8, wherein the processing unit is connected to a pressure sensor to measure a tyre inflation pressure parameter and is programmed to derive, from a first value of the geometrical parameter calculated at a first inflation pressure, a modified value of the pressure parameter at which the geometrical parameter adopts a predetermined or user set value.

15. The wheel service machine according to claim 8, wherein the processing unit is connected to a pressure sensor to measure a tyre inflation pressure parameter and wherein the processing unit is programmed to process a first value of the geometrical parameter at a first inflation pressure and a second value of the geometrical parameter at a second inflation pressure in order to derive data representing a trend of the geometrical parameter as a function of the inflation pressure.

16. The wheel service machine according to claim 8, wherein the processing unit is connected to an angular position sensor to receive a signal representing an angular position of a wheel mounted on the wheel-holder unit 4, and wherein the processing unit is programmed to acquire a plurality of values of the radial force parameter as a function of an angular position of the wheel about the first axis, in order to calculate a radial force value averaged relative to a predetermined angle of rotation imparted to the wheel about the first axis.

17. The wheel service machine according to claim 8, wherein the processing unit is configured to receive a signal representing radial force during a rotation of the wheel, has access to a value of an elasticity parameter representing an elasticity of the wheel to radial flattening, and is configured to derive an eccentricity parameter as a function of that signal and that elasticity parameter.

18. The wheel service machine according to claim 8, wherein the processing unit is configured to process data relating to at least one control parameter for four wheels of a vehicle and is programmed to suggest an ameliorative configuration as a function of that control parameter, wherein the ameliorative configuration refers to one or more of the following options:
- positioning of the wheels on a vehicle;
- coupling of a tyre to a wheel rim;
- relative angular position of a tyre relative to a wheel rim, and wherein the control parameter is one of the parameters from the following list:
- geometrical parameter;
- wheel eccentricity;
- tyre tread depth;
- wheel conicity.

19. The wheel service machine according to claim 18, wherein the processing unit is programmed to compare, for each simple combination of wheels taken two at a time, the control parameters relating to each wheel and to obtain an analysis parameter, in order to identify at least one pair of wheels which minimizes the analysis parameter.

20. The wheel service machine according to claim 8, wherein the wheel service machine is a tyre changer machine.

* * * * *